(12) United States Patent
Morrisroe

(10) Patent No.: US 9,198,275 B2
(45) Date of Patent: Nov. 24, 2015

(54) INDUCTIVE DEVICES AND LOW FLOW PLASMAS USING THEM

(71) Applicant: PERKINELMER HEALTH SCIENCES, INC., Waltham, MA (US)

(72) Inventor: Peter Morrisroe, New Milford, CT (US)

(73) Assignee: PERKINELMER HEALTH SCIENCES, INC., Waltham, MA (US)

(*) Notice: Subject to any disclaimer, the term of this patent is extended or adjusted under 35 U.S.C. 154(b) by 0 days.

(21) Appl. No.: 14/479,355

(22) Filed: Sep. 7, 2014

(65) Prior Publication Data

US 2015/0060418 A1 Mar. 5, 2015

Related U.S. Application Data

(63) Continuation of application No. 13/100,416, filed on May 4, 2011, now Pat. No. 8,829,386.

(60) Provisional application No. 61/331,610, filed on May 5, 2010.

(51) Int. Cl.
*B23K 10/00* (2006.01)
*H05H 1/30* (2006.01)

(52) U.S. Cl.
CPC . *H05H 1/30* (2013.01); *B23K 10/00* (2013.01)

(58) Field of Classification Search
CPC ............. H05H 1/30; H05H 1/28; H05H 1/46; B23K 10/00; G01N 21/68; G01J 3/443
USPC ........ 219/121.43, 121.52, 121.48; 118/723 I; 315/111.51
See application file for complete search history.

(56) References Cited

U.S. PATENT DOCUMENTS

| | | | |
|---|---|---|---|
| 4,004,117 A * | 1/1977 | Amsler | 218/123 |
| 4,575,609 A | 3/1986 | Fassel | |
| 4,833,294 A | 5/1989 | Montaser | |
| 5,725,153 A | 3/1998 | Wang | |
| 5,818,581 A * | 10/1998 | Kurosawa et al. | 356/316 |
| 5,908,566 A | 6/1999 | Seltzer | |
| 6,080,271 A * | 6/2000 | Fujii | 156/345.48 |
| 6,495,963 B1 * | 12/2002 | Bennett | 315/111.51 |
| 6,618,139 B2 * | 9/2003 | Erath | 356/316 |
| 6,899,787 B2 * | 5/2005 | Nakano et al. | 156/345.44 |
| 7,106,438 B2 | 9/2006 | Morrisroe | |
| 2004/0106213 A1 * | 6/2004 | McLaughlin et al. | 436/171 |
| 2004/0124779 A1 * | 7/2004 | Howald et al. | 315/111.51 |
| 2007/0075051 A1 | 4/2007 | Morrisroe | |
| 2008/0173810 A1 | 7/2008 | Morrisroe | |

OTHER PUBLICATIONS

ISR/WO for PCT/US11/35099 Dated Aug. 18, 2011.

* cited by examiner

*Primary Examiner* — Mark Paschall
(74) *Attorney, Agent, or Firm* — Rhodes IP PLC; Christopher R. Rhodes

(57) ABSTRACT

Certain embodiments described herein are directed to devices that can be used to sustain a low flow plasma. In certain examples, the low flow plasma can be sustained in a torch comprising an outer tube and an auxiliary tube within the outer tube. In some examples, the auxiliary tube comprises an effective length to match the shape of a low flow plasma sustained in the torch using a flat plate electrode. Methods and systems using the torches are also described.

19 Claims, 20 Drawing Sheets

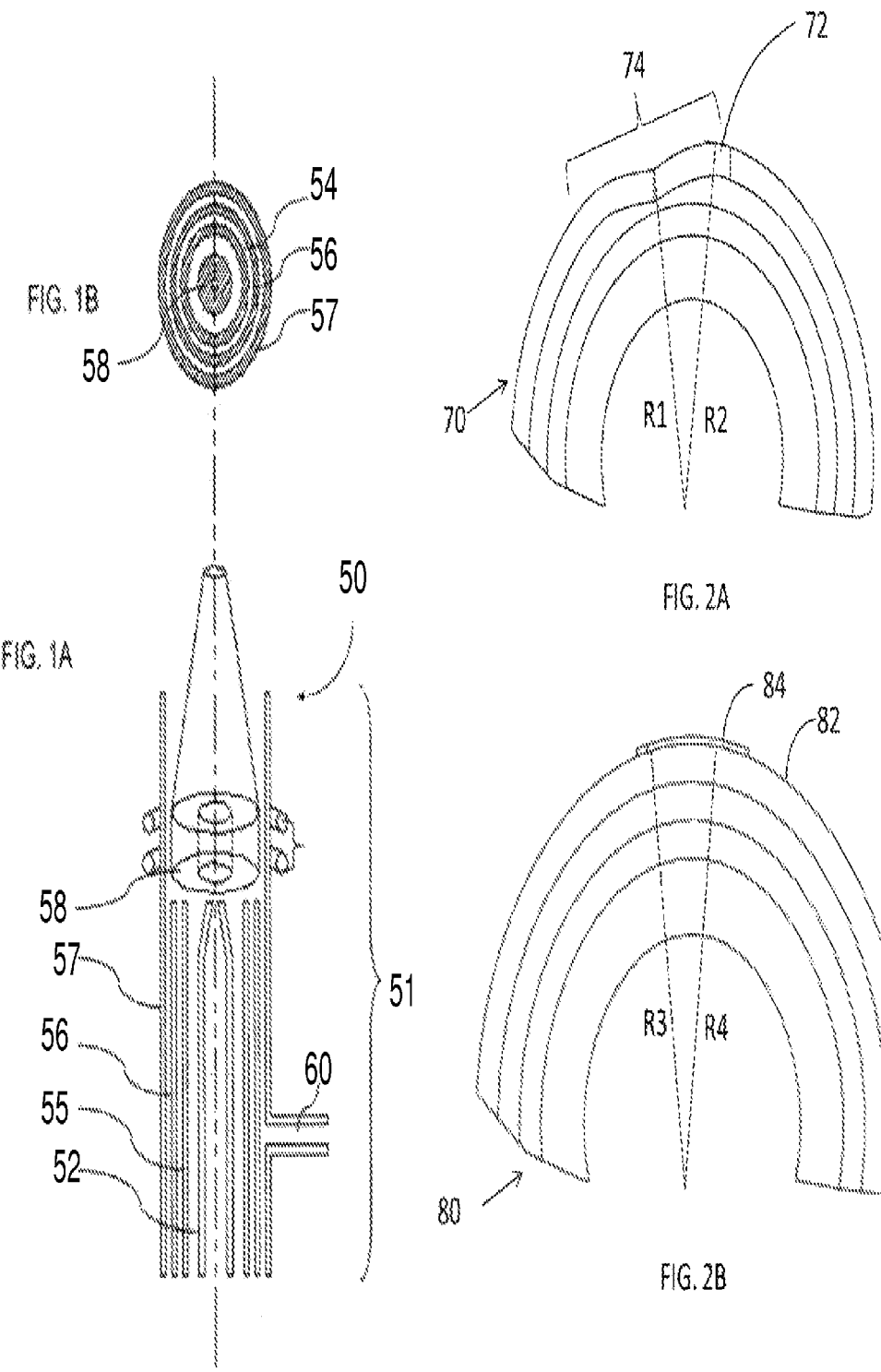

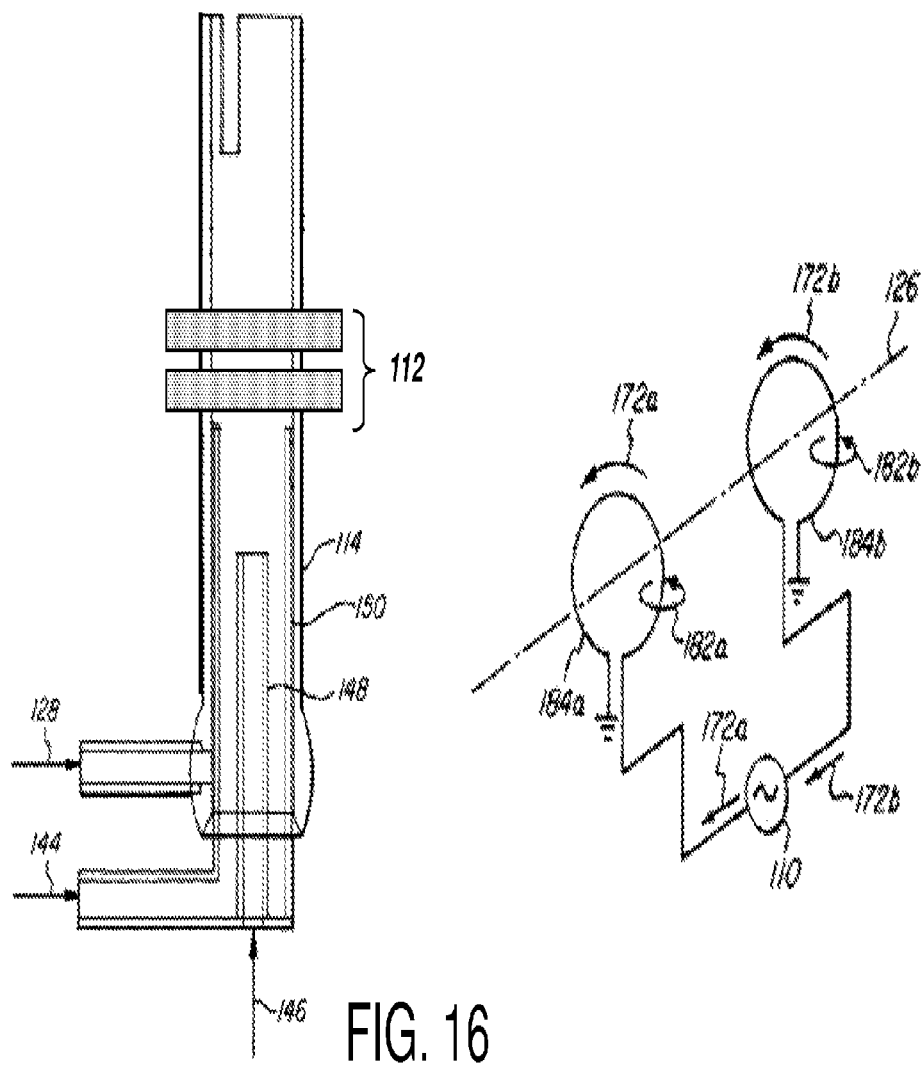

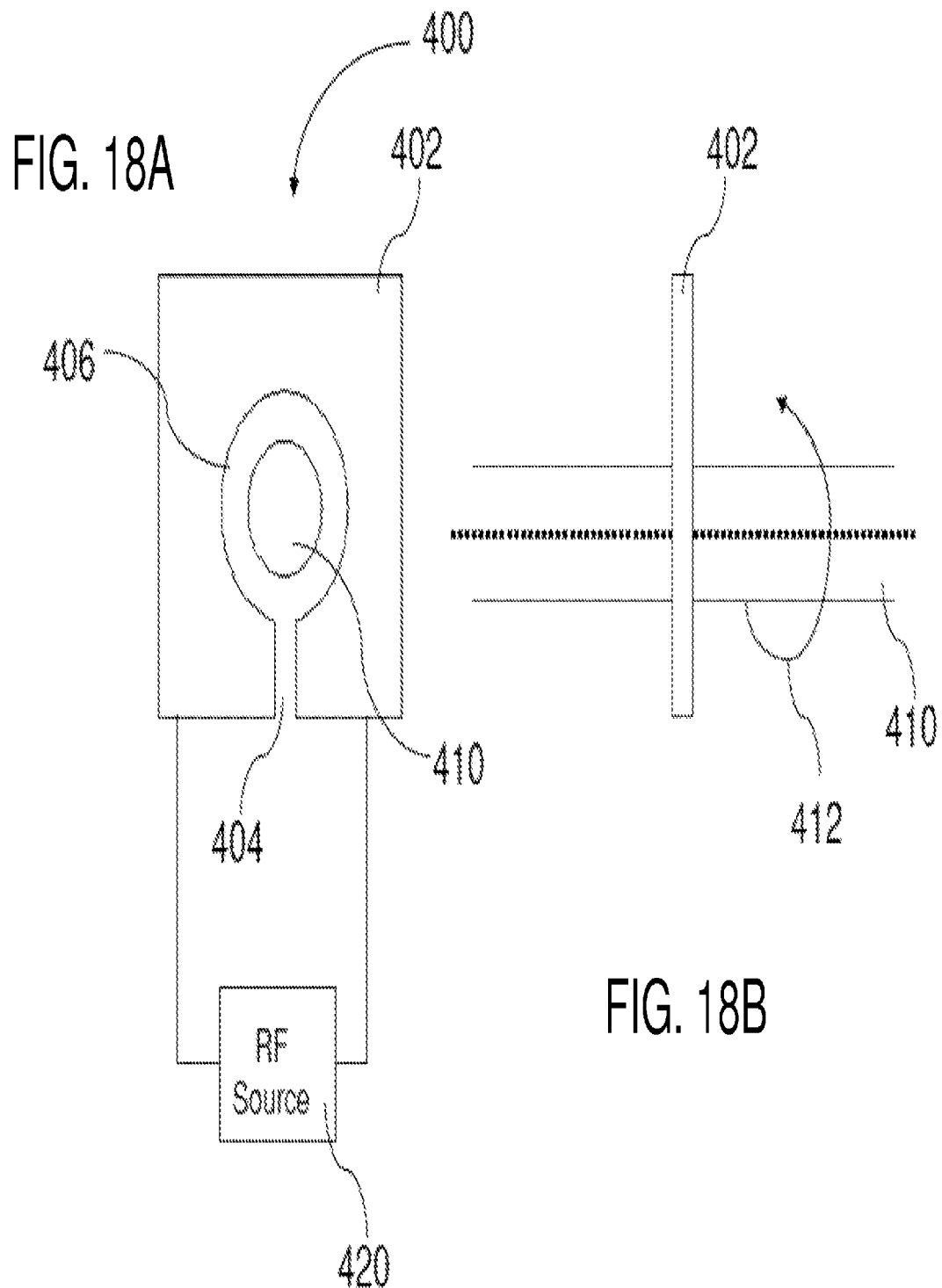

INDUCTIVE DEVICES AND LOW FLOW PLASMAS USING THEM

PRIORITY APPLICATION

This application claims priority to, and the benefit of, U.S. Provisional Application No. 61/331,610 filed on May 5, 2010, the entire disclosure of which is hereby incorporated herein by reference for all purposes.

TECHNOLOGICAL FIELD

This application is directed to plasma devices and methods using them. In particular, certain embodiments described herein are directed to low flow inductively coupled plasma sustained in a low flow torch.

BACKGROUND

Many inductively coupled plasma optical emission spectroscopy (ICP-OES) systems, inductively coupled plasma atomic absorption spectroscopy (ICP-AAS) systems, and inductively coupled plasma mass spectroscopy (ICP-MS) systems use a solenoid receptive of an RF electrical current for forming a plasma. However, the induced current generated by the magnetic field is skewed and non-homogeneous over the length of the interior of the solenoid due to the helical configuration of the solenoid. This non-homogeneity results in a variable temperature distribution within the plasma, which can affect sample excitation and the trajectory of ions in the plasma. In addition, the solenoid is a single element, which lacks flexibility in controlling the associated induced current formed by the magnetic field and the plasma/sample excitation.

SUMMARY

In a first aspect, a torch configured to sustain a low flow plasma is provided. In certain embodiments, the torch comprises an outer tube and an auxiliary tube within the outer tube, in which the outer tube comprises a bendless slot and the auxiliary tube comprises an effective length to permit generation of a low flow plasma in the torch using a flat plate electrode.

In certain examples, the outer tube of the torch can be substantially symmetrical such that all radii of the outer tube are substantially the same. In some examples, the slot can be positioned at one end of the outer tube. In other examples, the auxiliary tube can be at least 25% longer than an auxiliary tube present in a conventional torch. In certain configurations, the auxiliary tube can be about 9 mm longer than an auxiliary tube present in a conventional torch. In other examples, the width of the bendless slot can be about the same as the width present in a bended slot of a conventional torch. In certain embodiments, the auxiliary tube can be about 83 mm in length and the bendless slot can be about 15 mm in length. In some examples, the outer tube of the torch comprises at least three bendless slots. In certain configurations, each of the three slots can be about 25% shorter than a slot present in a conventional torch. In some configurations, each of the three bendless slots can be about the same length. In certain examples, the auxiliary tube can be about 83 mm in length and each of the three bendless slots can be about 15 mm in length.

In another aspect, a torch configured to sustain a low flow plasma and comprising an outer tube and an auxiliary tube within the outer tube is provided. In certain embodiments, the auxiliary tube comprises an effective length for the torch to sustain a low flow plasma generated with a flat plate electrode, in which the length of the auxiliary tube is longer than a length of an auxiliary tube configured to sustain a conventional plasma in a conventional torch comprising a helical load coil.

In certain examples, the length of the auxiliary tube can be selected to match the shape of the low flow plasma sustained using a plasma gas rate of about 8 liters/minute or less. In some examples, the outer tube comprises at least one bendless slot. In other examples, the auxiliary tube can be about 9 mm longer than an auxiliary tube length present in a conventional torch. In further examples, the bendless slot can be about 5 mm shorter than a bended slot length present in a conventional torch. In some examples, the outer tube comprises at least three bendless slots. In certain examples, each of the bendless slots can be at least 5 mm shorter than a bended slot length present in a conventional torch. In further examples, the auxiliary tube can be about 83 mm in length and the outer tube comprises a bendless slot at one end that is about 15 mm in length. In some examples, the auxiliary tube can be about 9 mm longer than an auxiliary tube present in a conventional torch, the outer tube comprises a bendless slot, and in which the bendless slot in the outer tube is at least 5 mm shorter than a bended slot in a conventional torch.

In an additional aspect, a low flow injector operative with a low flow plasma is provided. In some examples, the low flow injector can be configured to introduce an effective amount of a sample into the low flow plasma operating with a plasma gas of about 8 liters/minute or less.

In certain examples, the length of the low flow injector is longer than a conventional injector operable with a conventional plasma torch. In some examples, the length of the low flow injector is about 150 mm. In other examples, the low flow injector comprises one or more of alumina, quartz, sapphire, titania, titanium, an Inconel alloy, or an inert material. In certain examples, the low flow injector comprises a tapered end. In other examples, the low flow injector comprises a straight bore. In additional examples, the low flow injector can be configured as a capillary or can include a capillary. In some embodiments, the low flow injector can be operative to introduce sample into the low flow plasma when total gas flow is 9 liter/minute or less. In certain embodiments, the low flow injector can be used with a low flow plasma sustained in a torch comprising an outer tube and an auxiliary tube within the outer tube, in which the outer tube comprises at least one bendless slot, in which the auxiliary tube is about 83 mm in length and the bendless slot is about 15 mm in length.

In another aspect, a system for sustaining a low flow plasma is described. In certain embodiments, the system comprises a plate electrode comprising an aperture configured to receive a low flow torch, and a low flow torch sized and arranged to be positioned within at least some portion of the aperture of the plate electrode, the torch comprising an outer tube comprising a bendless slot and an auxiliary tube within the outer tube, in which the auxiliary tube comprises an effective length to sustain the low flow plasma in the torch.

In certain embodiments, the auxiliary tube can be about 83 mm long and the bendless slot can be about 15 mm long. In other embodiments, the auxiliary tube can be longer than an auxiliary tube present in a conventional torch. In further embodiments, the bendless slot can be shorter than a bended slot present on a conventional torch. In other embodiments, the bendless slot can be about 15 mm long and the auxiliary tube can be about 83 mm long. In some examples, the system can also include an oscillator electrically coupled to the plate electrode. In other examples, the system can include an additional plate electrode comprising an aperture configured to receive the low flow torch. In further examples, the system can include an oscillator electrically coupled to the plate electrode and the additional plate electrode. In certain embodiments, the oscillator can be configured to control the plate electrode and the additional plate electrode independently. In further embodiments, the system can include a detector optically coupled to the low flow torch.

In an additional aspect, a low flow plasma sustained in a low flow torch using a plasma gas of 8 liters/minute or less, the low flow torch comprising an outer tube comprising a bendless slot and an auxiliary tube within the outer tube is provided. In certain embodiments, the auxiliary tube of the low flow torch is longer than an auxiliary tube of a conventional torch. In some embodiments, the auxiliary tube is about 83 mm long. In certain examples, the bendless slot can be shorter than a slot present on an outer tube of a conventional torch. In other examples, the slot can be about 15 mm long. In some examples, an emission region and plasma region of the low flow plasma are compressed compared to the width of the two regions in a conventional flow plasma. In some embodiments, the low flow plasma can be sustained in a torch comprising three bendless slots in the outer tube. In certain examples, the three bendless slots can be spaced equally around the circumference of the outer tube. In some examples, the low flow plasma is sustained using argon. In certain embodiments, the total gas flow used to sustain the low flow plasma is less than 9 liters/minute.

In another aspect, a method of sustaining a low flow plasma in a low flow torch comprising a bendless slot in an outer tube and an auxiliary tube within the outer tube, the auxiliary tube comprising an effective length to sustain the low flow plasma in the low flow torch is disclosed. In certain examples, the method comprises introducing a plasma gas at a rate of about 8 liters/minute or less into the low flow torch, and sustaining the low flow plasma in the low flow torch by providing energy to the torch from at least one plate electrode. In some embodiments, the method can include configuring the bendless slot to be about 15 mm long. In other embodiments, the method can include configuring the low flow torch with at least three bendless slots. In further embodiments, the method can include configuring the auxiliary tube to be at least 25% longer than an auxiliary tube present in a conventional torch. In additional embodiments, the method can include configuring the auxiliary tube of the low flow torch to be about 83 mm long.

In an additional aspect, a method of facilitating production of a low flow plasma comprising providing a torch configured to sustain a low flow plasma, the torch comprising an outer tube and an auxiliary tube within the outer tube, in which the outer tube comprises a bendless slot and the auxiliary tube comprises an effective length to match the shape of a low flow plasma sustained in the torch using a flat plate electrode is provided.

In another aspect, a method of facilitating production of a low flow plasma comprising providing an auxiliary tube configured for use in a plasma torch comprising an outer tube, the auxiliary tube comprising an effective length to match the shape of a low flow plasma sustained in the plasma torch using a flat plate electrode is described.

In an additional aspect, a method of facilitating production of a low flow plasma comprising providing a bendless outer tube configured for use in a plasma torch comprising an auxiliary tube, the bendless outer tube comprising a slot with an effective length to permit generation of a low flow plasma in the plasma torch using a flat plate electrode is provided.

In another aspect, a method of facilitating introduction of a sample into a low flow plasma comprising providing an injector comprising an effective length to introduce sample into a low flow plasma torch comprising an outer tube and an auxiliary tube within the outer tube, in which the outer tube comprises a bendless slot and the auxiliary tube comprises an effective length to permit generation of a low flow plasma in the torch using a flat plate electrode is disclosed.

In an additional aspect, a method of facilitating production of a low flow plasma comprising providing a torch comprising an outer tube and an auxiliary tube within the outer tube, the auxiliary tube comprising an effective length for the torch to sustain a low flow plasma generated with a flat plate electrode, in which the length of the auxiliary tube is longer than a length of an auxiliary tube configured to sustain a conventional plasma in a conventional torch comprising a helical load coil is provided.

In another aspect, a method of facilitating production of a low flow plasma comprising providing an auxiliary tube configured for use in a plasma torch comprising an outer tube, the auxiliary tube comprising an effective length for the torch to sustain a low flow plasma generated with a flat plate electrode, in which the length of the auxiliary tube is longer than a length of an auxiliary tube configured to sustain a conventional plasma in a conventional torch comprising a helical load coil is described.

In an additional aspect, a method of facilitating introduction of a sample into a low flow plasma comprising providing an injector comprising an effective length to introduce sample into a low flow plasma torch comprising an outer tube and an auxiliary tube within the outer tube, in which the outer tube comprises a bendless slot and the auxiliary tube comprises an effective length for the torch to sustain a low flow plasma generated with a flat plate electrode, in which the length of the auxiliary tube is longer than a length of an auxiliary tube configured to sustain a conventional plasma in a conventional torch comprising a helical load coil is disclosed.

Additional features, aspect, examples and embodiments are described in more detail below.

BRIEF DESCRIPTION OF THE FIGURES

Certain embodiments are described with reference to the figures in which:

FIG. 1A is a view of a conventional torch and conventional flow plasma and FIG. 1B is a cross-sectional, top view through the torch and the conventional flow plasma of FIG. 1A, in accordance with certain examples;

FIG. 2A is a cross-section of a bended torch and FIG. 2B is a cross-section of a bendless torch comprising a single slot in an outer tube, in accordance with certain examples;

FIG. 16 is a diagram of an ICP torch showing the two plate electrodes, in accordance with certain examples;

FIG. 17 is a diagram of a plurality of loop currents driven by a single RF power source during alternating half cycles of a sinusoidally alternating current, in accordance with certain examples;

FIGS. 18A and 18B show a torch and an inductive device including a plate electrode, in accordance with certain examples;

Figure 3:
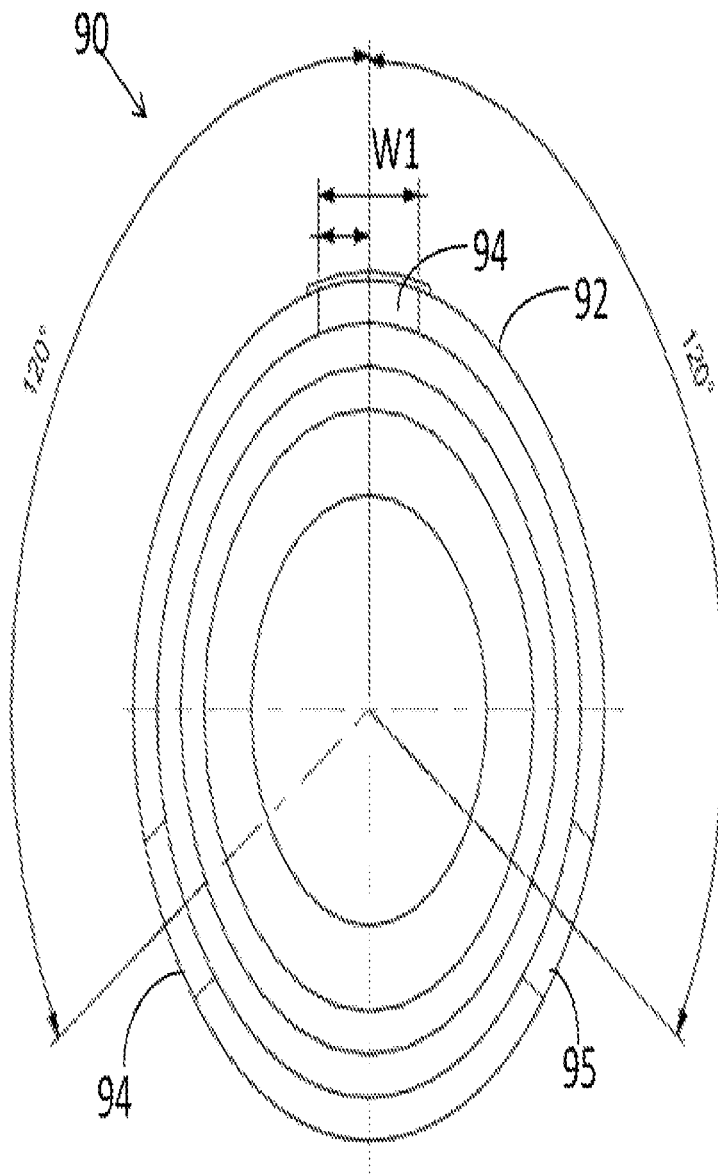
FIG. 3 is a cross-section of a bendless torch comprising three slots, in accordance with certain examples.

It will be recognized by the person of ordinary skill in the art, given the benefit of this disclosure, that certain dimensions or features in the figures may have been enlarged, distorted or shown in an otherwise unconventional or non-proportional manner to provide a more user friendly version of the figures. Where dimensions are specified in the description below, the dimensions are provided for illustrative purposes only.

DETAILED DESCRIPTION

Certain embodiments of the devices described herein can be constructed and arranged for use in sustaining low flow plasmas. The term "low flow" is relative and refers to the flow rate of plasma gas, e.g., argon, into a torch relative to the flow rate of plasma gas into a torch that is used in a typical inductively coupled plasma device that uses a helical inductive coil. For illustrative purposes only, a typical flow rate of plasma gas in a conventional instrument is about 15-20 Liters/minute or more. In certain embodiments described herein, the plasma gas flow rate of the system may be about 8 Liters/minute or less, more particularly about 7, 6, 5, 4, 3, 2 or 1 Liter/minute or less depending, for example, on the size and desired form of the plasma. In some embodiments, the total gas flow rate of the system may be about 9, 8, 7, 6, 5, 4, 3, 2 or 1 Liter/minute or less. Argon gas is very costly and is very difficult to obtain in remote areas of the world. Any reduction in instrument argon consumption may greatly reduce operating costs of plasma devices. Examples of certain methods and devices disclosed herein can reduce the argon consumption to less than one-half or one-quarter of the amount required to operate an existing plasma device (or instrument) not operable with a low flow torch. Certain examples of such low flow plasmas can further improve instrument performance by, for example, one or more of the following ways: increasing the signal (sample emission), lowering the background emission, improving the plasma stability and/or allowing a larger volume of sample to be introduced into the plasma.

In certain embodiments, the configuration and dimensions of the low flow torch, and components in it and used with it, may be different than those components used in a conventional plasma. For example, due to the different nature of a low flow plasma, a conventional torch and a conventional injector may not permit proper operation under low flow conditions. For example, a conventional torch may not provide a plasma with desired temperature distributions and shape when used under low flow conditions. Certain embodiments described herein are designed to permit operation under low flow conditions while providing a desired plasma shape, temperature distribution or other selected plasma properties.

In certain examples and for discussion purposes, a conventional torch used to sustain a conventional plasma, e.g., a non-low flow plasma, is shown in FIGS. 1A and 1B. Referring to FIG. 1A, an inductively coupled plasma device 50 includes a chamber 51 comprising three or more tubes, such as tubes 52, 54, 56, 57, a plasma 58, an inlet 60 and radio frequency induction coils 62. The tube 52 is fluidically coupled to a gas source, such as argon, and optionally a sample introduction device, such as a nebulizer. The argon gas aerosolizes the sample and carries it into the desolvation and ionization regions of the plasma 58. An auxiliary gas flow is supplied between tubes 52 and 54, which is used to shift the plasma above the inner tubes to keep them from melting. A plasma gas is supplied between tubes 54 and 56. A barrier gas passes between the outer tube 57 and the inner tube 56 to isolate the plasma 58 from the outer tube 57. Without wishing to be bound by any particular scientific theory or this example, a barrier gas may be introduced through inlet 60, and the bather gas flow cools the inside wall of the outside tube 57 and centers the plasma 58 radially. If desired, a barrier gas may be omitted entirely. The radio frequency inductions coils 62 are in electrical communication with a radio frequency generator (not shown) and are constructed and arranged to create and/or sustain the plasma 58 after the gas is ionized using an arc, spark, etc. FIG. 1B shows a cross-section through the inductively coupled plasma device 50. The outer tube of the torch 50 typically comprises a bend as described, for example, in commonly assigned U.S. Pat. No. 6,618,139. A bend is typically present to deter the creation of cushions of cool gas adjacent a slot in the outer tube. Such conventional torches are referred to in certain instances as a bended torch.

In certain examples described herein, a torch configured to sustain a low flow plasma and that comprises a bendless outer tube is described. A cross-section of a bended torch is shown in FIG. 2A and a cross-section of a bendless torch is shown in FIG. 2B. Referring to FIG. 2A, the conventional torch 70 comprises a slot 72 with a bend 74 such that a radius R1 is less than a radius R2. In comparison and referring to FIG. 2B, embodiments of a low flow torch 80 can be bendless or generally not include any inward curvature in a slot 84 of the outer tube 82 such that all radii, e.g., R3 and R4, are substantially the same.

In some embodiments, while the bendless torch may include substantially the same radii, the dimensions of the slots may be the same in the conventional torch and the low flow torch. In certain configurations, however, it may be desirable to alter the dimensions of the slot in the low flow torch as compared to the dimensions of the slot in the conventional torch. For example, it may be desirable to alter both the length and width of the slot, the length of the slot only, or the width of the slot only compared to dimensions of the outer slot in a conventional torch. In certain examples, the width of the slot in a conventional and low flow torch may be substantially the same, but the length of the slot in a conventional torch may be longer than the slot present in a low flow torch. For example, a low flow torch can include a slot at the end of the torch that is about 5 mm shorter than a corresponding slot present in a conventional torch. In some examples, the slot at the end of the low flow torch may be about 13-19 mm long, e.g., about 15 mm long, and about 5-6 mm wide or about 14-16 mm long, e.g., about 15 mm long and about 4-5 mm wide, e.g., about 15 mm long and 4.2 mm wide. For comparison purposes, a slot in a conventional torch is about 20-22 mm long and about 5-6 mm wide at its widest point. In certain instances, the length of the slot in the low flow torch can be at least 25% less than a length of an outer tube slot in a conventional torch.

In certain examples, the low flow torch can include a single slot as described in reference to FIG. 2B, whereas in other examples, the low flow torch can include two, three or more slots in an outer tube. In certain embodiments, a multi-slot torch may provide for advantageous uses in certain instances. For example, a detector may "view" through a single slot radially, whereas the detector could view through more than a single slot if multiple slots are present. In addition, multiple slots may permit better detection limits of certain types of samples, e.g., organic samples, than when a torch with a single slot is used. Other advantages of using a multi-slot torch will be readily selected by the person of ordinary skill in the art, given the benefit of this disclosure. In some examples, a cross-section of a low flow torch comprising three slots is shown in FIG. 3. The torch 90 comprises slots 94, 95 and 96, each of which is spaced about 120 degrees from the other slots. While the torch 90 is shown as including substantially symmetrical slot spacing around the circumference of an outer tube 92, asymmetric spacing is also possible where more than a single slot is present in the outer tube 92. Where more than a single slot is present in the low flow torch, each of the slots may have the same dimensions or each of the slot may be sized differently than the other slots. In certain examples, each slot of a multi-slot low flow torch may be about 25% less in length than a length of an outer tube slot in a conventional torch, though all slots need not be the exact same size. In other configurations, each slot of a multi-slot low flow torch may be about 25% less in length than a length of an outer tube slot in a conventional torch with all slots having about the same length. In other examples, two of the slots may have about the same length and one or more other slots may have a different length. Similarly, the width W1 of each slot may be the same or may be different from the other slots. In certain configurations, each slot in a three slot torch may be about 12-19 mm in length, e.g., about 15 mm in length, and about 3.5-6 mm in width, e.g., about 4.2 mm in width, at its widest point.

In certain embodiments, the auxiliary tube present in a bendless low flow torch may be different than an auxiliary tube present in a conventional torch. For example, because the plasma region may be shifted in a low flow plasma as compared to the plasma position in a conventional plasma, it may be desirable to alter the dimensions or configuration of the auxiliary tube. In certain configurations where a plate electrode is used as an inductive device, the induction region may be smaller but shifted away from the base of the low flow torch. As such it may be desirable to lengthen the auxiliary tube of the low flow torch. In some examples, the auxiliary tube of the low flow torch may be about 10% longer than an auxiliary tube present in a conventional torch. For example, the auxiliary tube present in a low flow torch may be about 80-90 mm, e.g., 82-88 mm or about 83 mm or about 84 mm. For comparison purposes, the length of an auxiliary tube in a conventional torch may be about 70-75 mm in length, for example about 74 mm in length. In certain instances, the auxiliary tube present in a low flow torch is at least 8-9 mm longer than a corresponding auxiliary tube used in a conventional torch to sustain a conventional plasma. While the length of the auxiliary tube may be altered, the width of the auxiliary tube may be substantially similar to the width of an auxiliary tube present in a conventional torch, e.g., about 18-19 mm or about 18.6 mm. If desired, however, the width of the auxiliary tube may also be altered to provide desired low flow plasma properties, e.g., may be wider or narrower.

In certain embodiments, other components used with the low flow torches described herein may be altered to provide for proper operation of the system. For example, the injectors used with the low flow torches may be altered such that they provide a desired flow rate, couple to the low flow torch in a desired manner or otherwise permit proper operation of the low flow plasma. In some examples, a low flow injector can be used with the low flow torches described herein. In certain examples, the low flow injector can be configured to introduce an effective amount of a sample into the low flow plasma operating with a plasma gas of about 8 liters/minute or less. In some embodiments, the length of the injector is longer than a conventional injector operable with a conventional plasma torch. In other embodiments, the length of the low flow injector is about 140-160 mm, e.g., about 150 mm. In some examples, the low flow injector can be tapered at one end such that the diameter at that end is smaller, or, in other examples, the low flow injector may be a straight bore injector such that the internal diameter is substantially the same along the length of the injector.

In certain embodiments, a fluid flow path of the injector can include an inert material. In some examples, the inert material may also be temperature and/or acid resistant such that it will not melt near the high temperature plasma or adversely be altered by a solvent or sample. In some configurations, only the fluid flow path is produced using the inert material, whereas in other examples, the entire injector can be produced using the inert material. Illustrative types of inert materials include, but are not limited to, alumina, zirconia, quartz, sapphire, titania, titanium, Inconel alloys, alloys coated with inert coatings such as Sulfinert and the like.

In operation, the injector is typically fluidically coupled to other components of a sample introduction system, e.g. a nebulizer, to permit introduction of a fluid sample into the low flow plasma. Suitable fittings, couplings and the like can be used with the injector to facilitate such coupling. In some embodiments, the low flow injector can include a capillary or can be configured as a capillary. In certain examples, the low flow injector can be operative to introduce sample into the low flow plasma when total gas flow in the system is 9 liters/minute or less, e.g., 8 liters/minute, 7 liters/minute, 6 liters/minute, 5 liters/minute, 4 liters/minute, 3 liters/minute, 2 liters/minute or 1 liters/minute or less.

In certain embodiments, the low flow plasma torches, low flow injectors, and plate electrodes described herein can be used in many different types of devices and instruments including, but not limited to, optical emission spectrometers, absorption spectrometers, mass spectrometers or the like. For example, plate electrodes can be used to sustain a low flow plasma in a low flow torch present in an inductively coupled plasma-mass spectrometer (ICP-MS) or in other types of instruments. In addition, the plate electrodes can be used to sustain low flow plasmas in non-instrument devices such as welding torches, light sources, chemical reactors or other types of devices. It will also be recognized by the person of ordinary skill in the art, given the benefit of this disclosure, that the particular shapes and sizes of the plate electrodes can vary, and those representations of plate electrodes shown below are provided merely for illustration and are not intended to limit the scope of the technology described herein.

Figure 4:
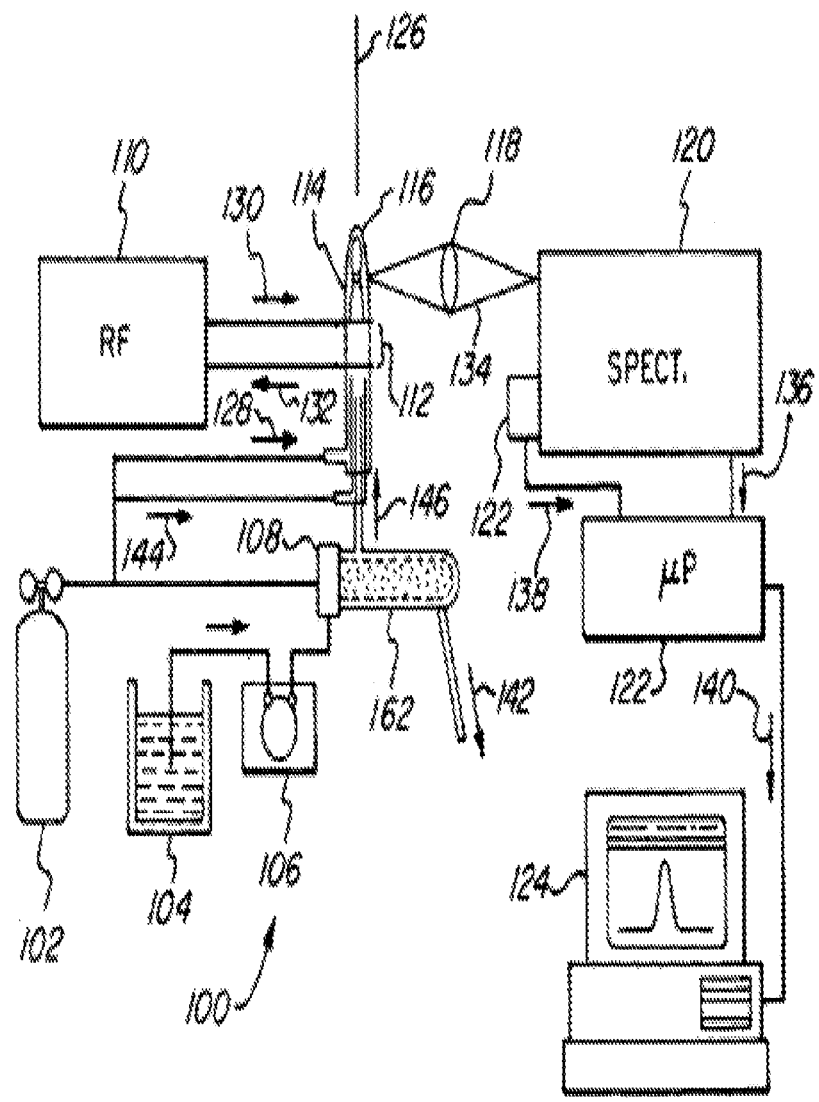
FIG. 4 is an illustration of an optical spectrometer, in accordance with certain examples.

In certain embodiments, a schematic diagram of an exemplary inductively coupled plasma-optical emission spectrometer (ICP-OES) 100 is shown in FIG. 4. In certain examples, the ICP-OES 100 generally comprises a system for directing a carrier gas 102 to a low flow torch 114, where the carrier gas 102 is ionized to form a hot plasma 116 (e.g., 5,000-10,000K or greater). As described herein, the operating conditions can be selected such that the plasma 116 is a low flow plasma such as, for example, a plasma that is sustained using an argon flow rate of about 8 Liters/minute or less. In some examples, the plasma 116 can include a preheating zone 190, an induction zone 192, an initial radiation zone 194, an analytic zone 196 and a plasma tail 198 (see FIG. 6). An atomized sample 104 can be directed to the plasma 116 through a pump 106, a nebulizer 108 and spray chamber 162. In the illustrative configuration shown in FIG. 4, a RF power source 110 provides RF power to the plasma 116 by way of an inductive device 112 that comprises one or more plate electrodes as described herein. In plasma 116, excited sample atoms 104 can emit light 134 as the excited atoms decay to a lower state. The emitted light 134 may be collected by collection optics 118 and directed to a spectrometer 120 where it is spectrally resolved. A detector 122 can be operative to detect the spectrally resolved light 134 and provide a signal 138, 140 to a microprocessor 122 and computer network 124 for analysis. In examples where the species do not emit light, an inductively coupled atomic absorption spectrometer may be used to provide light to the atomized species and a detector may be used to detect light absorption by the atomized species. Illustrative atomic absorption spectrometers are available from PerkinElmer Health Sciences, Inc. and exemplary absorption spectrometers are described, for example, in commonly owned U.S. patent application Ser. No. 11/372,996 and entitled "Plasmas and Devices Using Them" and filed on Mar. 11, 2006, the entire disclosure of which is hereby incorporated herein by reference.

In FIG. 4, the plasma 116 is shown as being viewed from a direction at a right angle to the longitudinal axis of the plasma 116, i.e., viewed radially or viewed along the radial axis. However, it will be understood by the person of ordinary skill in the art, given the benefit of this disclosure, that the viewing of the plasma 116 may also be performed from a direction along the longitudinal axis 126 of the plasma 116, i.e., viewed axially. Detection of light emissions in the axial direction can provide significant signal-to-noise benefits.

Figure 5:
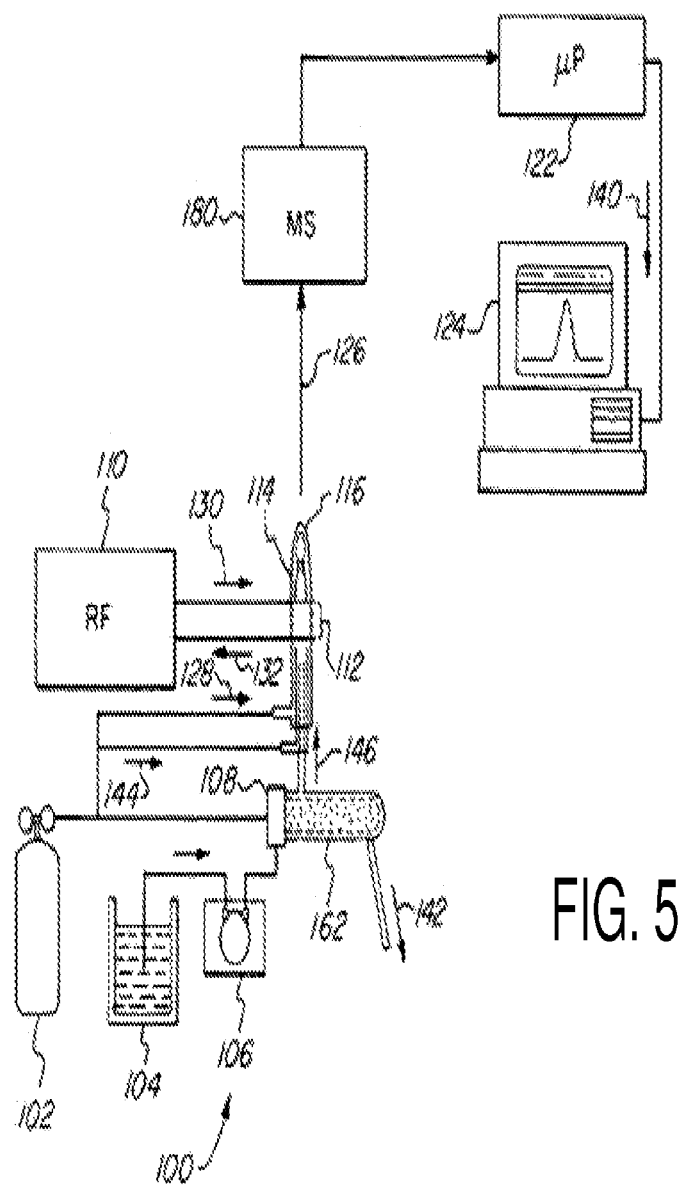
FIG. 5 is an illustration of mass spectrometer including first and second plate electrodes, in accordance with certain examples.

It will also be understood by the person or ordinary skill in the art, given the benefit of this disclosure, that the low flow inductively coupled plasma may also be used with a mass spectrometer, (MS) 180 such as a quadrupole mass analyzer in an inductively coupled plasma-mass spectrometer (ICP-MS) 100 as seen in FIG. 5. The RF power source 110 operates generally in the range of about 1 to about 500 MHz, particularly 20-50 MHz, e.g., 27-40 MHz and powers of about 100 Watts to about 10 kilowatts, e.g., about 1000 Watts to about 1500 Watts, are supplied to the electrodes to generate the magnetic field. Illustrative mass spectrometers are commercially available from PerkinElmer Health Sciences, Inc. and exemplary mass spectrometers are described, for example, in commonly owned U.S. patent application Ser. No. 11/372,996 and entitled "Plasmas and Devices Using Them" and filed on Mar. 11, 2006 and in the examples below.

Figure 6:
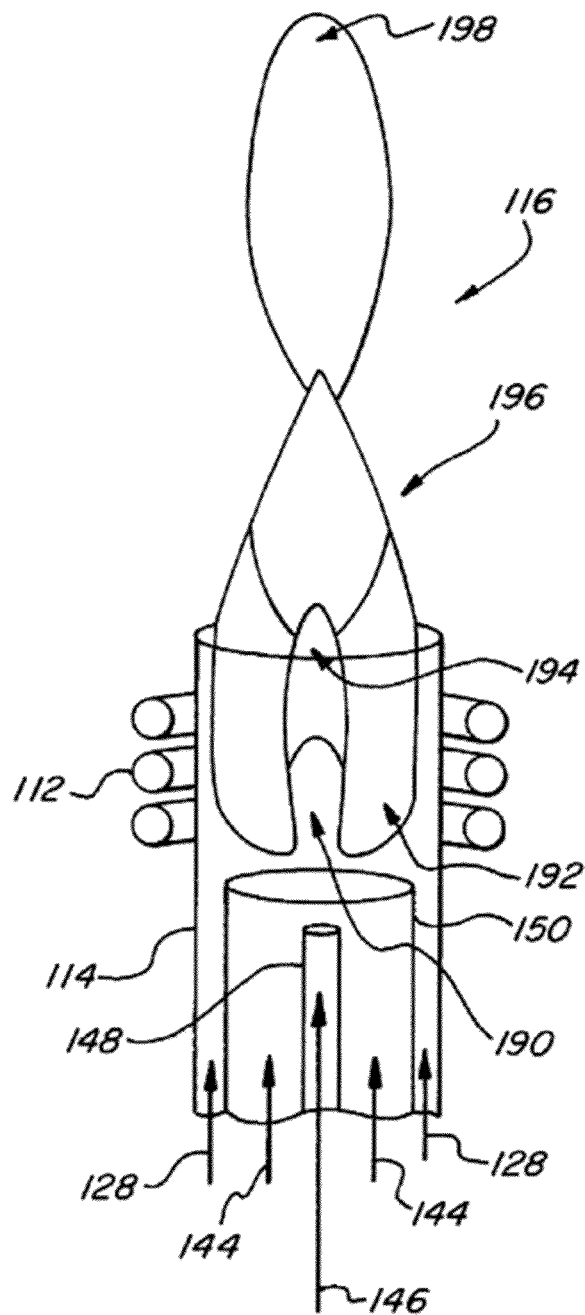
FIG. 6 is a diagram of an inductively coupled plasma (ICP) torch and a low flow ICP sustained using plate electrodes, in accordance with certain examples.

FIG. 6 shows a more detailed schematic of the plasma 116 of FIGS. 4 and 5. The torch 114 includes three concentric tubes 114, 150, and 148. The innermost tube 148, provides atomized flow 146 of the sample into the plasma 116. The middle tube 150, provides auxiliary gas flow 144 to the plasma 116. In embodiments of a low flow torch, the middle tube 150 can be longer as compared to the length of a middle tube present in a conventional torch. For example, the middle tube can be about 80-90 mm long, e.g., about 83 mm long. The outermost tube 114, provides carrier gas flow 128 for sustaining the plasma. As described herein, the outermost tube 114 can include one or more slots with a suitable length, e.g., about 15 mm. The carrier gas flow 128 may be directed to the plasma 116 in a laminar flow about the middle tube 150. The auxiliary gas flow 144 may be directed to the plasma 116 within the middle tube 150 and the atomized sample flow 146 may be directed to the plasma 116 from the spray chamber 162 along the innermost tube 148. The RF current 130, 132 in the load coil 112 may form a magnetic field within the load coil 112 so as to confine the low flow plasma 116 therein.

Figure 7:
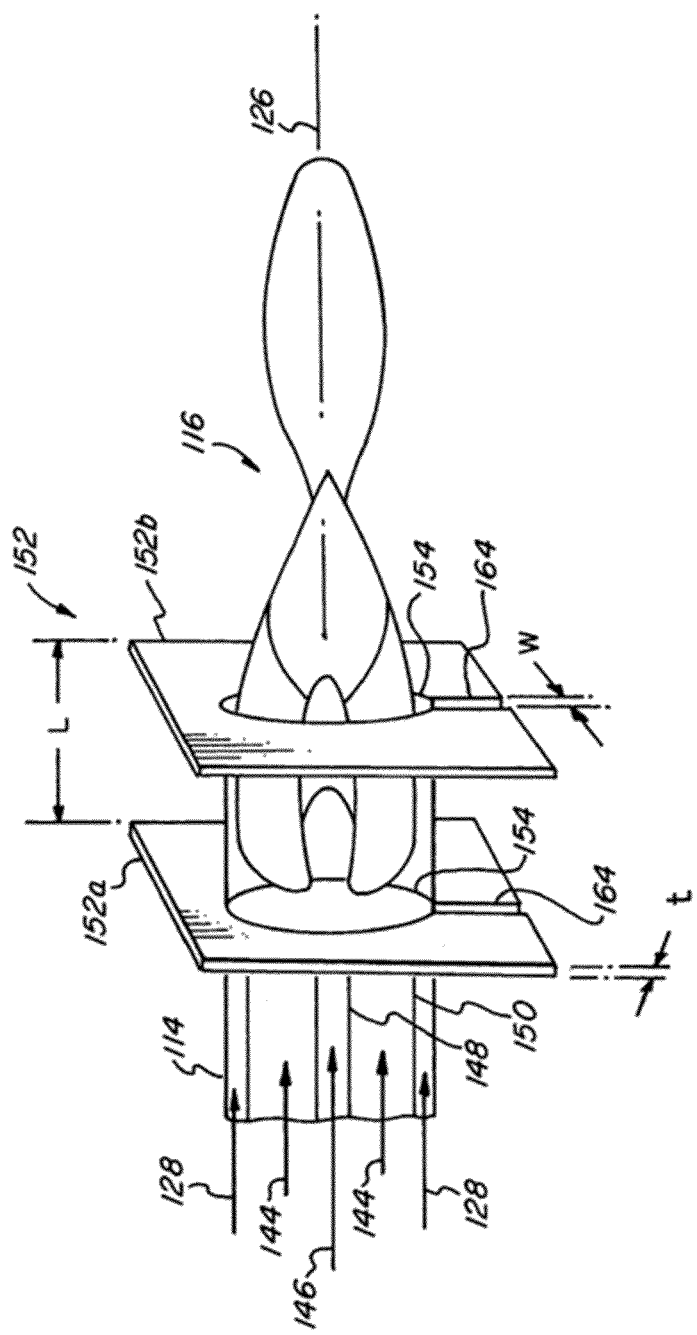
FIG. 7 is a side view of two plate electrodes, an ICP torch and a low flow plasma, in accordance with certain examples.

The plasmas shown in FIGS. 4-6, and shown in certain other figures described herein, can be generated using numerous different plate electrode configurations. FIGS. 7-14 show various configurations of an electrode 152, 156, 158. In FIG. 7, the electrode 152 comprises two substantially parallel plates 152a, 152b positioned at a distance 'L' from one another. In certain examples, the substantially parallel plates have a width of about 20 mm to about 200 mm, e.g., about 40 mm, and a length of about 30 mm to about 90 mm, e.g., about 70 mm Each of the parallel plates 152a, 152b includes an aperture 154 through which the torch 114 may be positioned such that the torch 114, the innermost tube 148, the middle tube 150 and the aperture 154 are aligned along an axis 126. The exact dimensions and shapes of the aperture may vary and may be any suitable dimensions and shapes that can accept a low flow plasma torch. For example, the aperture may be generally circular and have a diameter of about 10 mm to about 60 mm, may be square or rectangular shaped and have dimensions of about 20 mm to about 60 mm wide by about 20 mm to about 100 mm long, may be triangular, oval, ovoid, or other suitable geometries. In certain examples, the aperture may be sized such that it is about 0-50% or typically about 3% larger than the low flow plasma torch, whereas in other examples, the torch may contact the plates, e.g., some portion of the torch may contact a surface of a plate, without any substantial operational problems. The substantially parallel plates 152a, 152b have a thickness of 't.' In some examples, each of plates 152a and 152b have the same thickness, whereas in other examples plates 152a and 152b may have different thicknesses. In certain examples, the thickness of the plates is from about 0.025 mm (e.g., such as a metallized plating on an insulator, an example of this would be copper, nickel, silver, or gold plating on a ceramic substrate) to about 20 mm, more particularly, about 0.5 mm to about 5 mm, or any particular thickness within these exemplary ranges. The aperture 154 of the electrode 152 may also include a slot 164, of width 'w' such that the aperture 154 is in communication with its surroundings. The width of the slot may vary from about 0.5 mm to about 20 mm, more particularly, about 1 mm, to about 3 mm, e.g., about 1 mm to about 2 mm. In certain examples, only a single plate electrode can be used to sustain the low flow plasma, whereas in other examples two or more plates can be used in combination with a low flow plasma torch.

In certain examples, the electrodes may be constructed from the same or different materials. In certain examples, the electrodes may be constructed from conductive materials such as, for example, aluminum, gold, copper, brass, steel, stainless steel, conductive ceramics and mixtures and alloys thereof. In other examples the electrodes may be constructed from non-conductive materials that include a plating or coating of one or more conductive materials. In some examples, the electrodes may be constructed from materials capable of withstanding high temperatures and resisting melting when exposed to the high circulating currents required to generate the low flow plasma. These and other suitable materials for constructing the electrodes will be readily selected by the person of ordinary skill in the art, given the benefit of this disclosure.

Figure 8:
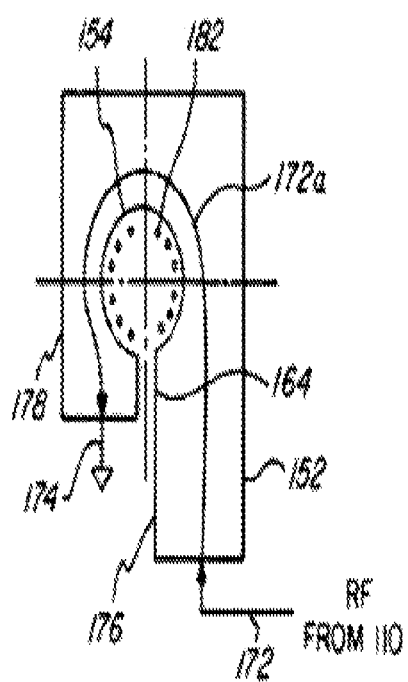
FIG. 8 is a front view of a first plate electrode for sustaining a low flow plasma, the electrode including an aperture, in accordance with certain examples.
Figure 15:
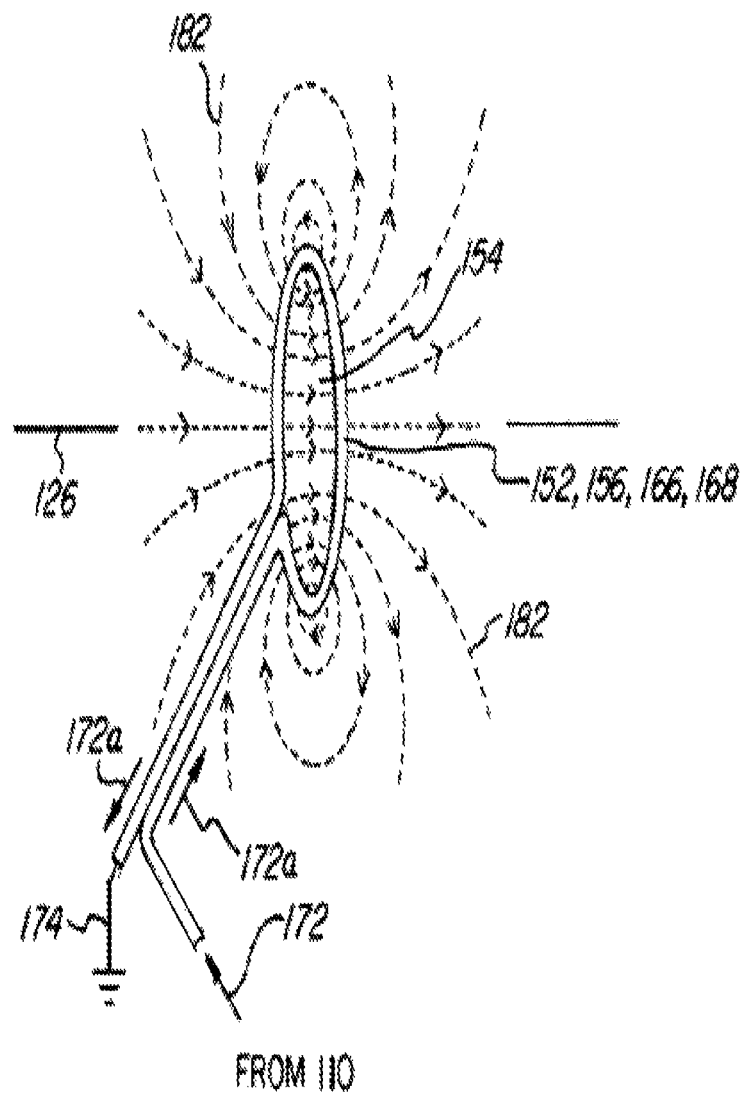
FIG. 15 is a perspective view of an illustrated magnetic field generated from a loop current, in accordance with certain examples.

Referring to FIGS. 7 and 8, the electrode 152 may be generally comprised of a square or rectangular planar shape, though it may be a wire as seen in FIG. 15. In certain examples, the RF current supplied to the planar electrode creates a planar loop current 172a, which generates a toroidal magnetic field 182 through the aperture 154 (see FIG. 15). The planar current loop may be substantially parallel to a radial plane, which is substantially perpendicular to the longitudinal axis of the torch. The toroidal magnetic field may be operative to generate and sustain a low flow plasma within a low flow torch. Under low flow conditions, argon gas may be introduced into the torch at flow rates of about 8 Liters/minute or less. A low flow plasma may be generated using a spark or an arc to ignite the argon gas. The toroidal magnetic field causes argon atoms and ions to collide, which results in a superheated environment, e.g., about 5,000-10,000 K or higher, that forms the low flow plasma.

Figure 9:
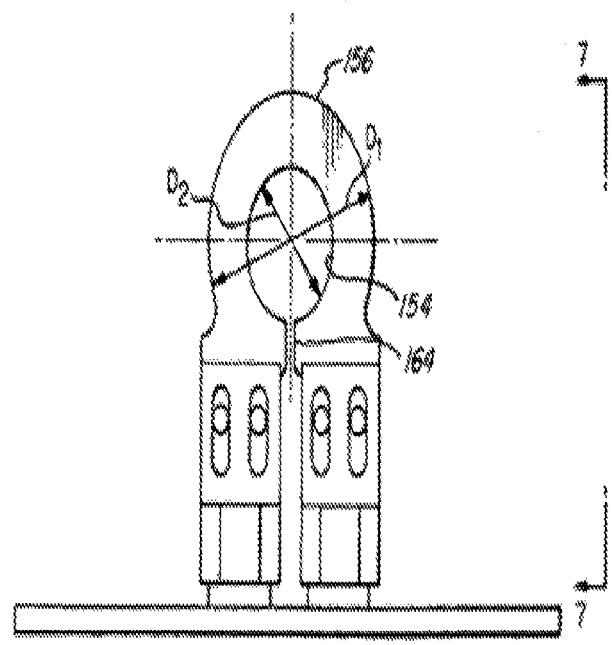
FIG. 9 is a front view of a second plate electrode for sustaining a low flow plasma, the electrode including an aperture, in accordance with certain examples.
Figure 10:
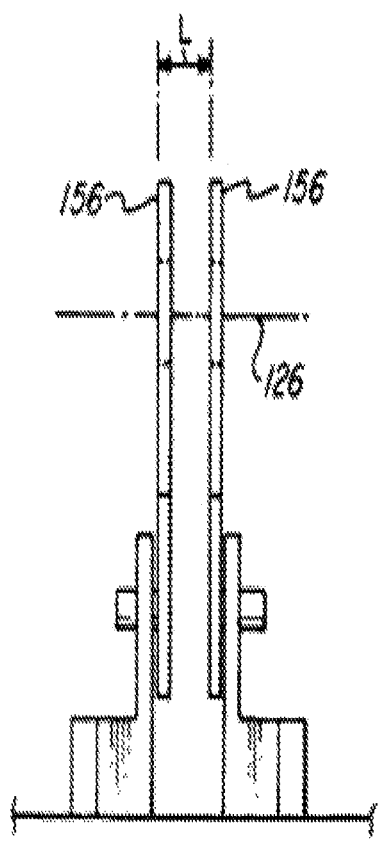
FIG. 10 is a side view of the electrode of FIG. 9, in accordance with certain examples.
Figure 11:
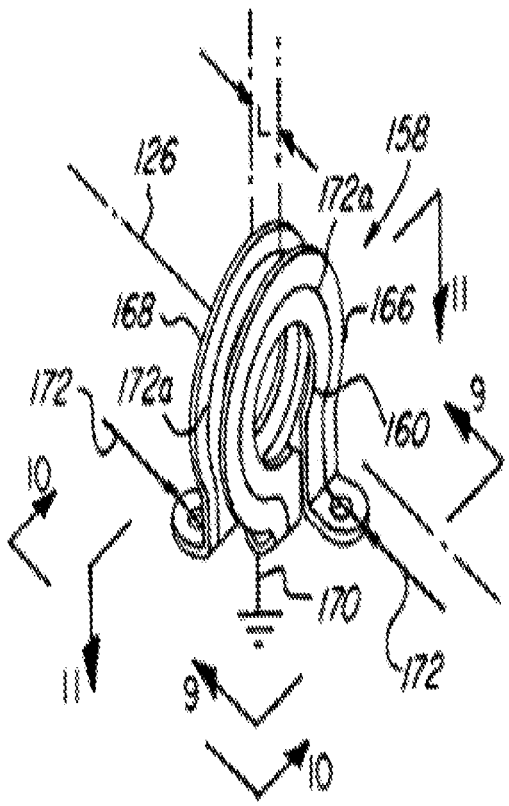
FIG. 11 is a perspective view of a unitary electrode, in accordance with certain examples.
Figure 12:
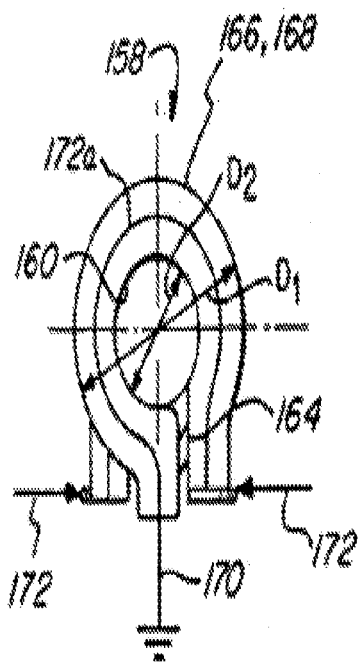
FIG. 12 is a front view of the electrode of FIG. 11, in accordance with certain examples.
Figure 13:
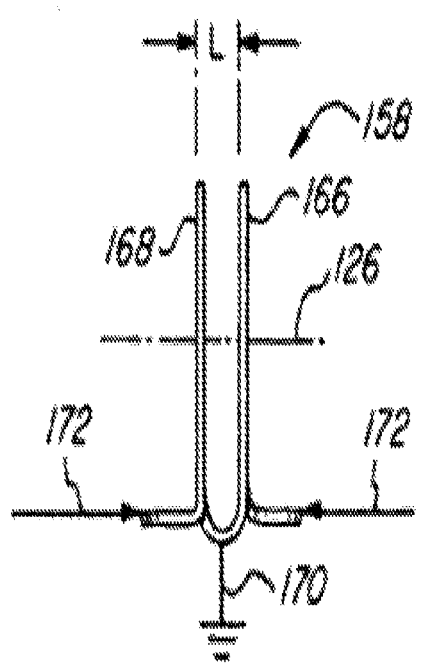
FIG. 13 is a side view of the electrode of FIG. 11, in accordance with certain examples.
Figure 14:
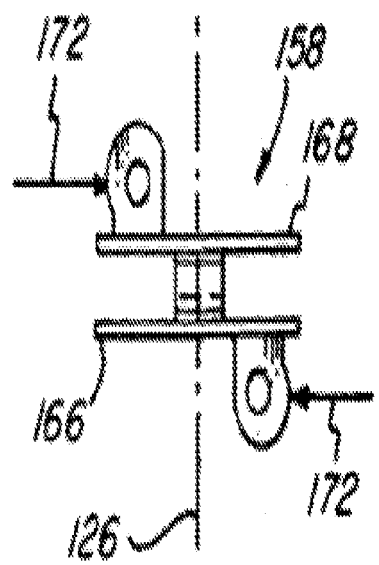
FIG. 14 is a top view of the electrode of FIG. 11, in accordance with certain examples.

Referring now to FIGS. 9 and 10, the electrode 156 may be of a rounded nature having an outside diameter of $D_1$ and inside aperture diameter of $D_2$. In some examples, the outside diameter ranges from about 10 mm to about 20 cm, more particularly about 25 mm to about 10 cm, e.g., about 30 mm to about 50 mm, and the inside diameter ranges from about 10 mm to about 15 cm, more particularly, from about 5 mm to about 5 cm, e.g., about 20 mm to about 24 mm. In certain examples, electrodes 152, 156 of FIGS. 7-10 may be distinct elements which are supplied independently with RF electrical current 172 and typically of opposite polarity (though opposite polarity is not required for operation). In other examples, electrodes 152, 156 of FIGS. 7-10 may be elements in electrical communication and may each be suitably designed to provide the desired polarity to generate a magnetic field.

In certain embodiments, one part 176 of the electrode 152 may be supplied with the RF power while a second part 178 of the electrode 152 may be tied to a ground 174. In some examples, the electrode may be grounded to the instrument chassis, whereas in other examples, the electrode may be mounted and grounded to a grounding plate, which itself may be grounded in a suitable manner. During arc ignition of the low flow plasma, if the ignition arc makes contact with electrode 152, any unwanted electric currents set up in the electrode 152 may be directed to the ground point 174 and not through to the RF power supply 110. The RF power and frequency supplied to each electrode 152 may be independently controlled and varied for optimum performance. For instance, each electrode 152 may be operated at a different frequency in order to optimize the plasma emission and excitation. In addition, one electrode (or both electrodes) may be operated in a continuous power mode while the other electrode can be modulated (e.g., pulsed or gated). In certain examples, the distance, 'L', between the electrodes 152 may be adjusted since the electrodes 152 are not connected to one another, which can result in adjustment of the power distribution within the low flow plasma. Yet further, the diameter, $D_2$ of the aperture 154 may be independently adjusted in order to adjust the coupling characteristics between the RF power supply 110 and the low flow plasma.

In certain examples, spacers may be placed between some portion of the electrodes to control the distance between the electrodes. In certain examples, the spacers are constructed using the same materials used to construct the electrodes. In some examples, the spacers can be produced from a material having substantially the same coefficient of thermal expansion as the electrode material so that as the electrode expands and contracts with different temperatures, the spacer expands and contracts at about the same rate. In some examples, the spacers are stainless steel washers, brash washers, copper washers or washers made from other suitable conductive materials. In certain examples, the spacers are washers that are sized suitably to receive a bolt or nut that connects the electrodes. By using one or more spacers, the distance between the electrodes may be easily reproduced and/or altered. It will be within the ability of the person of ordinary skill in the art, given the benefit of this disclosure, to select suitable materials and shapes for spacers for use with the electrodes disclosed herein.

Referring now to FIGS. 11-14, an induction device 158 is shown as including two plate electrodes 166, 168 connected to a common electrical ground 170. Induction device 158 may be configured as a circular plate electrodes 166 and 168 being electrically coupled to each other, if desired. When RF current 172 is supplied to the induction device 158, loop currents 172a are generated, which creates a toroidal magnetic field. Loop currents 172a are substantially parallel to the planar surfaces of electrodes 166 and 168 and would be substantially perpendicular to the longitudinal axis of the torch. The induction device 158 may be grounded at common electrical ground 170 (see FIG. 13) to prevent unwanted arcing, which can result in melting of electrodes 166 and 168. In certain examples, plate electrodes 166 and 168 are spaced a distance L from each other (see FIGS. 11 and 13). The exact distance between the plate electrodes 166 and 168 can vary and illustrative distances include, but are not limited to, about 1 mm to about 5 cm, more particularly about 2 mm to about 2 cm, e.g., about 5 mm to about 15 mm. In certain examples, the plate electrodes 166 and 168 are arranged substantially perpendicular to a mounting surface. In other examples, the plate electrodes 166 and 168 can be tilted at an angle so that the axial dimension of the torch and the radial dimension of the electrodes are substantially perpendicular. In some examples, each of plate electrodes 166 and 168 may be angled in the same direction, whereas in other examples, the plate electrodes 166 and 168 may be angled in opposite directions. The person of ordinary skill in the art, given the benefit of this disclosure, will be able to select suitable configurations and angles for the plate electrodes of the illustrative induction devices disclosed herein.

In certain examples, an exemplary configuration of an induction device surrounding a torch is shown in FIG. 16. Induction device 112 comprising first and second plate electrodes can surround concentric fluid conduits 114, 150 and 148. Carrier gas flow 128 may be introduced into the torch to provide gas for generation of the plasma using the induction device 112. Auxiliary gas flow 144 may be introduced into concentric tube 150 to provide gas for controlling the plasma position relative to the injector 148. As described herein, the tube 150 may be longer, e.g., have a length of about 83 mm, compared to the auxiliary tube length in a conventional torch and a suitable longer injector may also be used with a low flow plasma. Sample flow 146 may enter aerosol conduit 148 where it is sprayed into the plasma generated by induction device 112.

The exact flow rates of the various gas species may vary depending on the particular low flow conditions selected. For example, the carrier gas is typically introduced at a flow rate of about 1 Liter/minute to about 8 Liters/minute, e.g., about 6-7.5 Liters/minute. The auxiliary gas is typically introduced at a flow rate of about 0 Liters/minute to about 1 Liter/minute, e.g., about 0.1 to about 0.3 Liters/minute. The sample can be introduced at a suitable flow rate to provide desolvation and/or atomization of the sample. In some examples, the sample is introduced at a flow rate of about 0.1 L/minute to about 2 L/minute, e.g., about 0.3 to about 0.7 Liters/minute. If these different gas flow rates are added, then the total argon flow rate may be about 6 to about 9 Liters/minute. In some examples, the total argon flow rate is about 7 Liters/minute to less than or equal to 8 Liters/minute. Additional flow rates for the carrier gas, auxiliary gas and sample will be readily selected by the person of ordinary skill in the art, given the benefit of this disclosure, to sustain a low flow plasma in a torch using plate electrodes.

Referring FIG. 17, a plurality of loop currents 184a, 184b are shown generated from a single RF electric current source 110. For clarity of illustration, the plate electrodes have been omitted from FIG. 17. The loop currents 184a, 184b are generated by applying a current of opposite polarities to apposing electrodes. The loop currents 184a, 184b may be oriented with respect to one another in a suitable manner such that the alternating electric current 172a in a first loop current 184a flows in the same direction as that of the alternating electric current 172b in a second loop current 184b during alternating half cycles of a sinusoidally alternating current. This configuration allows for the plurality of loop currents 184a, 184b to be driven from a single power source 110 so as to generate magnetic fields 182a, 182b having the same spatial orientation. If desired, diagonally apposing legs of each coil can be driven from a single RF source located directly below, and the remaining two legs, also diagonally apposing, are commonly connected to a grounded plate. The plane of the loop currents 184a, 184b is also substantially perpendicular to the longitudinal axis 126 of the low flow torch and is substantially parallel to a radial plane of the low flow torch. In certain examples, the loop currents can be used to sustain a low flow plasma using only the plate electrodes. For example, other devices such as an induction coil commonly used to generate ICPs can be omitted, and the plate electrodes can be used by themselves as an inductive device to sustain a low flow plasma. If desired, the plate electrodes can be used in a system including a low flow injector such that the injector flow rates are suitable for use with the low flow plasma.

In accordance with certain examples, a device for generating a low flow plasma comprising a first plate electrode constructed and arranged to provide a first loop current along a radial plane that is substantially perpendicular to a longitudinal axis of a low flow plasma torch can be used. Referring to FIGS. 18A and 18B, device 400 includes electrode 402, which has a slot 404 and an aperture 406 for receiving a torch 410. The electrode 402 has a circular inner cross-section that is substantially symmetrical. In certain examples, the diameter of the inner cross-section is about 10 mm to about 60 mm, more particularly about 20 mm to about 30 mm, e.g., about 20 mm to about 23 mm. In some examples, the diameter of the inner cross-section is selected such that about 1 mm of distance separates the outer surface of the torch 410 from the inner portion of the electrode 402. The electrode 402 may be positioned such that it is substantially perpendicular to the longitudinal axis (shown in FIG. 18B as a dotted line) of the torch 410. The slot 404 of the electrode 402 may be configured such that the current provided to electrode 402 will take the form of a loop, such as a loop current 412 shown in FIG. 18B. In some examples, the loop current 412 is substantially perpendicular to the longitudinal axis of the low flow torch 410, e.g., the plane of the loop current is substantially perpendicular to the longitudinal axis of the low flow torch 410. Use of a substantially perpendicular loop current may generate and/or sustain a low flow plasma that has a more symmetrical temperature distribution, for a selected radial plane, than a low flow plasma generated using helical load coils. In certain examples, the selected overall shape of the electrode may vary. For example and as shown in FIG. 18A, electrode 402 is configured with an overall rectangular shape. However, other suitable shapes, such as circles, triangles, rings, ellipses, toroids and the like may also be used. In some embodiments, for example, a single plate electrode having a circular cross-section and a circular apertures can be used to sustain a low flow plasma. The first plate electrode may be mounted to a grounding plate as described herein.

In certain examples, a second electrode similar to the electrode 402 in FIG. 18A may also be constructed and arranged parallel to a radial plane, which is substantially perpendicular to a longitudinal axis of a low flow torch 410. In other examples, the plane of the second loop current may be substantially parallel to the plane of the first loop current. In some examples, the first and second loop currents may flow in the same direction, whereas in other examples the first and second loop currents may flow in an opposite direction. In examples where more than one plate electrode is used, a single RF source, such as the RF source 420 shown in FIG. 18A, may provide RF power to each of the first and second electrodes, or separate RF sources may provide RF power to the first and second plate electrodes. In some examples, spacers can be used to separate the first and second electrodes. In examples where a single RF source is used to provide RF power to the first and second plate electrodes and where spacers are used, the spacers can be made of, or include, a conductive material, e.g., aluminum, copper, brass, gold and the like. In other examples, the spacers can be made of, or include, a non-conductive material, e.g., glass, plastics, etc., to prevent current flow from the first electrode to the second electrode. For example, it may be desirable to separate the plate electrodes using non-conductive materials so that the plates are not shorted to each other.

Figure 19A:
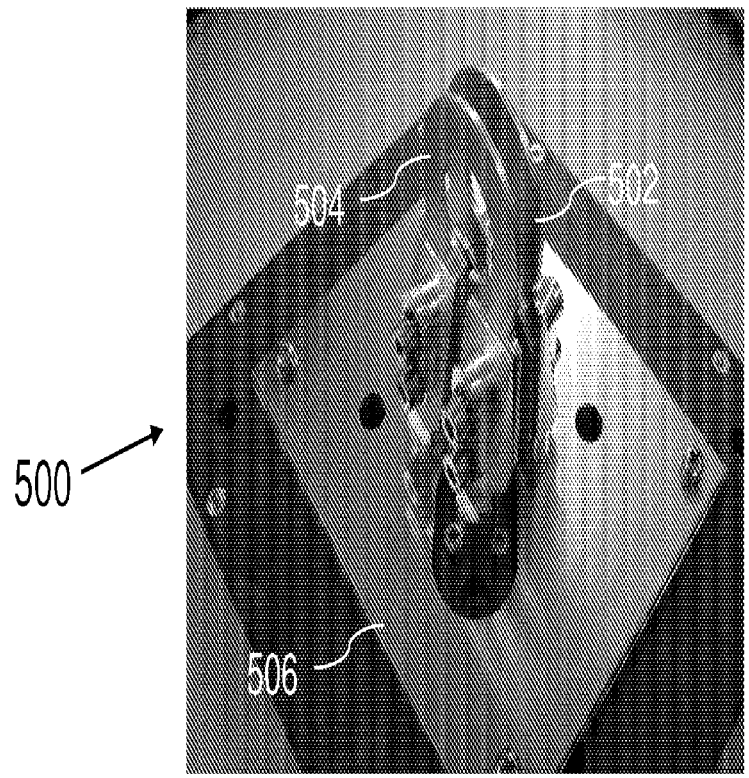
FIGS. 19A and 19B are examples of inductive devices, in accordance with certain examples.
Figure 19B:
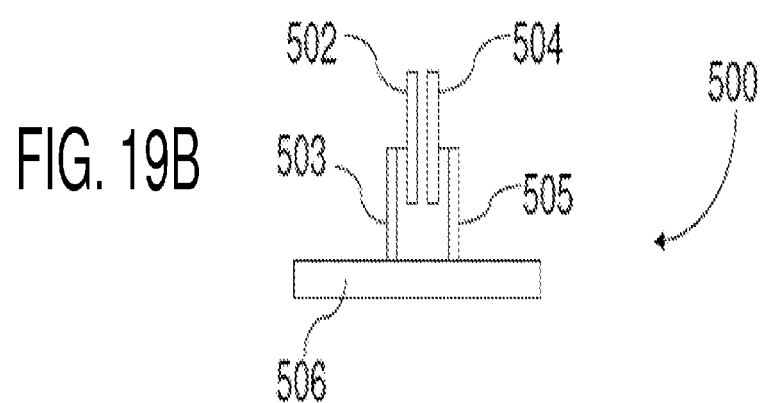

In certain examples, the first plate electrode, the second plate electrode or both can be grounded to a grounding plate. For example and referring to FIGS. 19A and 19B, an induction device 500 may include a first plate electrode 502 and a second plate electrode 504 each coupled to a grounding plate

506. In the example shown in FIGS. 19A and 19B, the electrodes 502 and 504 may be mounted to the grounding plate 506 using supports 503 and 505, respectively. In certain examples, the diagonally apposing legs of each electrode 502 and 504 may be driven by a single RF source located directly below, and the remaining two legs, also diagonally apposing, may be commonly connected to the grounding plate 506. In some examples, all components may be electrically coupled through the four identical mounts identified as 503 and 505. The supports 503 and 505 may provide electrical coupling between the plate electrodes 502 and 504 and the grounding plate 506 such that during arc ignition of the low flow plasma, if an ignition arc makes contact with the plate electrodes 502, 504, any unwanted electric currents set up in the plate electrodes 502, 504 may be directed to the grounding plate 506 and not passed through to the RF power supply (not shown) in electrical communication with the plate electrodes 502 and 504. Use of the plate electrodes 502 and 504 with the grounding plate 506 and with a low flow torch may provide a more symmetrical low flow plasma, which can improve detection limits of certain species (as discussed in more detail in the examples herein) than low flow plasmas generated using helical load coils. For example, using existing helical load coils there may exist areas of the plasma that have a reduced temperature and are inefficient at desolvation and atomization due to the plasmas tendency to follow the helix of the load coil resulting in a non-uniform plasma discharge. Using examples of the induction devices disclosed herein in combination with a low flow torch, a low flow plasma having a more symmetrical temperature distribution, for a selected radial plane, can be generated which can provide for more even desolvation and atomization, which can result, for example, in improved performance, extended torch life, and less carbon buildup when used with organics.

In certain examples, an induction device as disclosed herein may be operated at much lower powers than conventional helical load coils. For example, a power of about 800 Watts to about 1500 Watts, e.g., about 900 Watts to about 1350 Watts, may be used with an induction device disclosed herein to sustain a low flow plasma suitable for use, for example, in instruments for chemical analysis. For comparative purposes only, a typical conventional helical load coil uses about 1450 Watts of power or more to sustain a plasma suitable for chemical analysis. In some examples, an induction device provided herein is configured to use about 10-20% less power than a helical load coil. In addition to the above, the power provided to the induction device can be varied during operation. For example, a first power level can be used during ignition, and the power can be subsequently decreased or increased to a second power level during operation of the device that includes the low flow plasma.

In some examples, the exact thickness of the plate electrode and the grounding plate can vary depending, for example, on the intended use of the device, the desired shape of the low flow plasma, etc. In certain examples, the plate electrode is about 0.05-10 mm thick, more particularly, about 1-7 mm, thick, e.g., about 1, 2, 3, 4, 5, or 6 mm thick or any dimensions between these illustrative thicknesses. Similarly, the exact dimensions and thickness of the grounding plate may vary. For example, the grounding plate may be from about 5 mm to about 500 mm wide to about 5 mm to about 500 mm long, or it could be as large as the whole instrument chassis itself, and may have a thickness from about 0.025 mm thick to about 20 mm thick. It will be within the ability of the person of ordinary skill in the art, given the benefit of this disclosure, to select suitable electrode and grounding plate dimensions and thicknesses to provide a desired plasma shape.

Figures 19C, 19D:
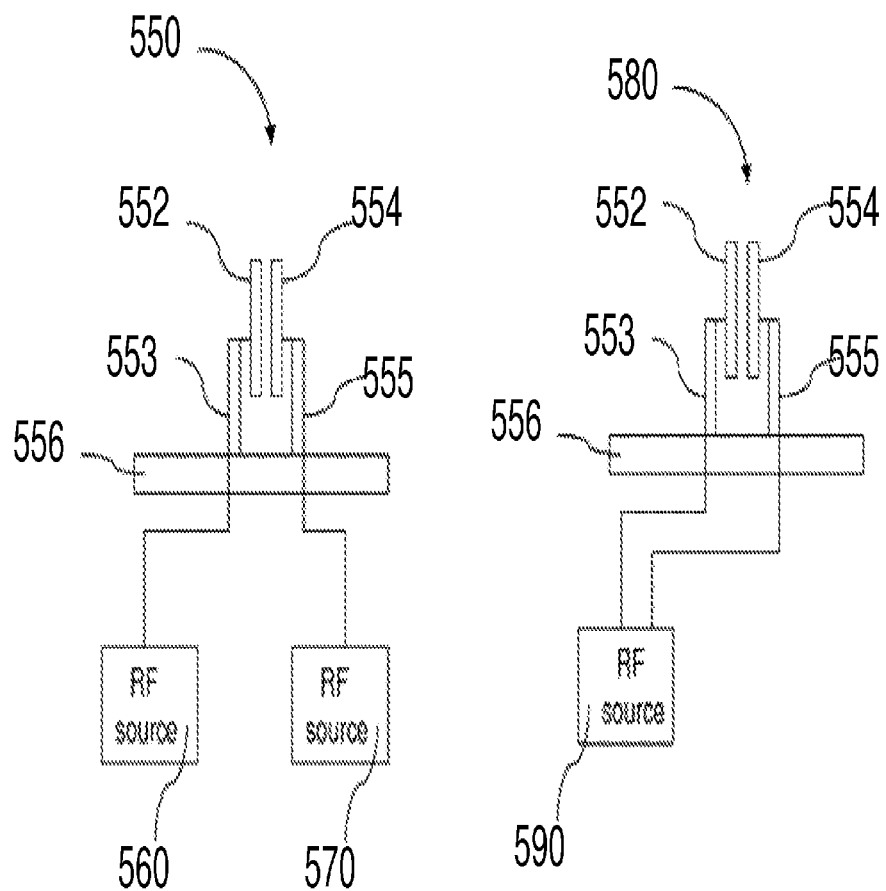
FIGS. 19C and 19D are other examples of inductive devices, in accordance with certain examples.

In certain embodiments, each plate electrode of an induction device may be individually tuned or controlled. Referring to FIG. 19C, an induction device 550 includes plate electrodes 552 and 554 each electrically coupled to a grounding plate 556 through supports 553 and 555, respectively. The grounding plate 556 can be configured to prevent unwanted arcing, which can result in melting of the plate electrodes 552, 554. In certain configurations, the grounding plate 556 can itself be grounded to the instrument chassis. An RF source 560 can be configured to provide a current to the plate electrode 552, and an RF source 570 can be configured to provide a current to the plate electrode 554. The current supplied to the plate electrodes 552 and 554 can be the same or can be different. The current may also be altered or changed during operation of the plasma to change the shape and/or temperature of the plasma. In other examples, a single RF source can be configured to provide current to both plate electrodes 552, 554. For example and referring to FIG. 19D, an induction device 580 includes plate electrodes 552 and 554 each electrically coupled to a grounding plate 556 through supports 553 and 555, respectively. An RF source 590 can be configured to provide a current to each of the plate electrodes 552 and 554. Even though a single RF source may be used to provide current to the plate electrodes 552 and 554, the current supplied to each plate electrode may or may not be the same. For example, suitable electronic circuitry may be implemented to supply one of the plate electrodes with a different current. The person of ordinary skill in the art, given the benefit of this disclosure, will be able to design suitable induction devices using one or more RF sources.

In certain examples, a device for sustaining a plasma in a torch having a longitudinal axis along which a flow of gas is introduced during operation of the torch and having a radial plane substantially perpendicular to the longitudinal axis of the torch is provided. In certain examples, the device includes plate means for providing a loop current along a radial plane of the torch. Suitable plate means include, but are not limited to, any one or more of the plate electrodes disclosed herein or other suitable devices that can provide loop currents along a radial plane. If desired the plate means can be used with low flow torch means to sustain a low flow plasma in the low flow torch means. In addition, low flow injector means may also be used with the plate means.

Figure 20:
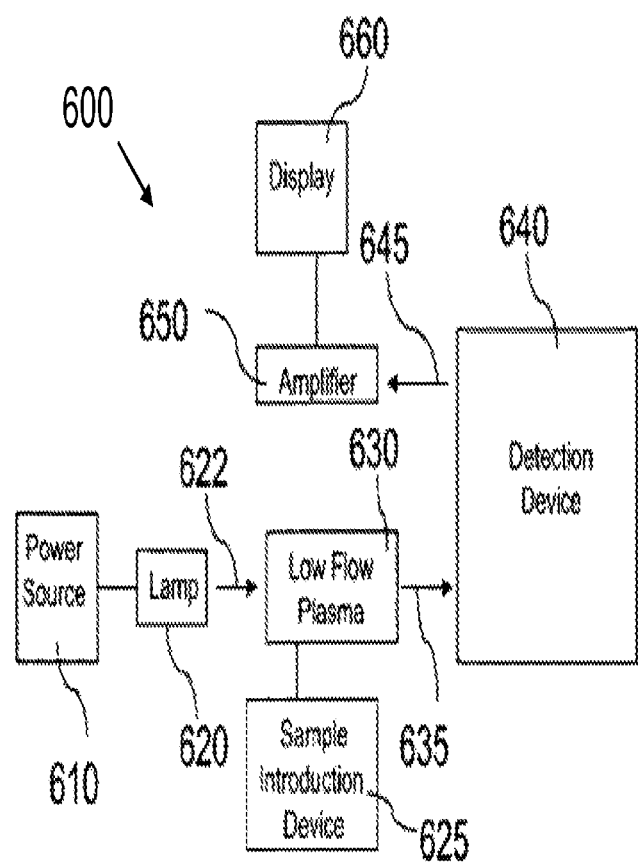
FIG. 20 is an illustration of an absorption spectrometer including a low flow plasma, in accordance with certain examples.

In certain examples and referring to FIG. 20, an illustrative single beam AS device 600 includes a power source 610, a lamp 620 connected to the power source 610, a sample introduction device 625 in fluid communication with a low flow plasma 630, a detection device 640 configured to receive a signal from the low flow plasma 630, an optional amplifier 650 configured to receive a signal from the detection device 640, and a display 660 in electrical communication with the amplifier 650. The sample introduction device 625 can include a low flow injector as described herein. The power source 610 may be configured to supply power to the lamp 620, which provides one or more wavelengths of light 622 for absorption by atoms and ions. Suitable lamps include, but are not limited to electrode-less discharge lamps, hollow cathode lamps, mercury lamps, cathode ray lamps, lasers, etc., or combinations thereof. The lamp 620 may be pulsed using suitable choppers or pulsed power supplies, or in examples where a laser is implemented, the laser can be pulsed with a selected frequency, e.g., 5, 10, or 20 times per second. The exact configuration of the lamp 620 can vary. For example, the lamp 620 can provide light axially along the plasma 630, e.g., along the long-axis of the torch, or can provide light radially along the low flow plasma 630, e.g., perpendicular to the long-axis of the torch. The example shown in FIG. 20 is configured to provide light axially from the lamp 620. There can be signal-to-noise advantages using axial viewing of signals. As sample is atomized and/or ionized in the low flow plasma 630, the incident light 622 from the lamp 620 excites atoms. That is, some percentage of the light 622 that is supplied by the lamp 620 is absorbed by the atoms and ions in the low flow plasma 630. The remaining percentage of light 635 is transmitted to the detection device 640. The detection device 640 can select one or more suitable wavelengths using, for example, a prism, a lens, a grating and other suitable devices such as those discussed above in reference to the OES devices, for example. In some examples, the detection device 640 may include a solid-state detector, such as a CCD. The signal may be provided to the optional amplifier 650 for increasing the signal for transmission to the display 660. In examples where the signal is large enough to be detected using the circuitry and devices in the detection device 640, the amplifier 650 may be omitted. To account for the amount of absorption by sample in the low flow plasma 630, a blank, such as water, can be introduced prior to sample introduction to provide a 100% transmittance reference value. The amount of light transmitted once sample is introduced into the low flow plasma may be measured, and the amount of light transmitted with sample can be divided by the reference value to obtain a transmittance. The negative $\log_{10}$ of the transmittance is equal to the absorbance. The AS device 600 may further include suitable electronics such as a microprocessor and/or computer and suitable circuitry to provide a desired signal and/or for data acquisition. Suitable additional devices and circuitry can be found, for example, on commercially available AS devices such as, for example, AAnalyst series spectrometers commercially available from PerkinElmer Health Sciences, Inc. It will also be within the ability of the person of ordinary skill in the art, given the benefit of this disclosure, to retrofit existing AS devices to generate low flow plasmas and to design new AS devices using the low flow plasmas disclosed herein. The AS devices may further include autosamplers known in the art, such as AS-90A, AS-90plus and AS-93plus autosamplers commercially available from PerkinElmer Health Sciences, Inc. The low flow plasma 630 can be sustained using one or more plate electrodes, as described herein, and a plasma gas flow of about 8 Liters/minute or less, more particularly about 7 Liters/minute of plasma gas or less. In some examples, the total gas flow through the torch can be about 8 Liters/minute or less.

Figure 21:
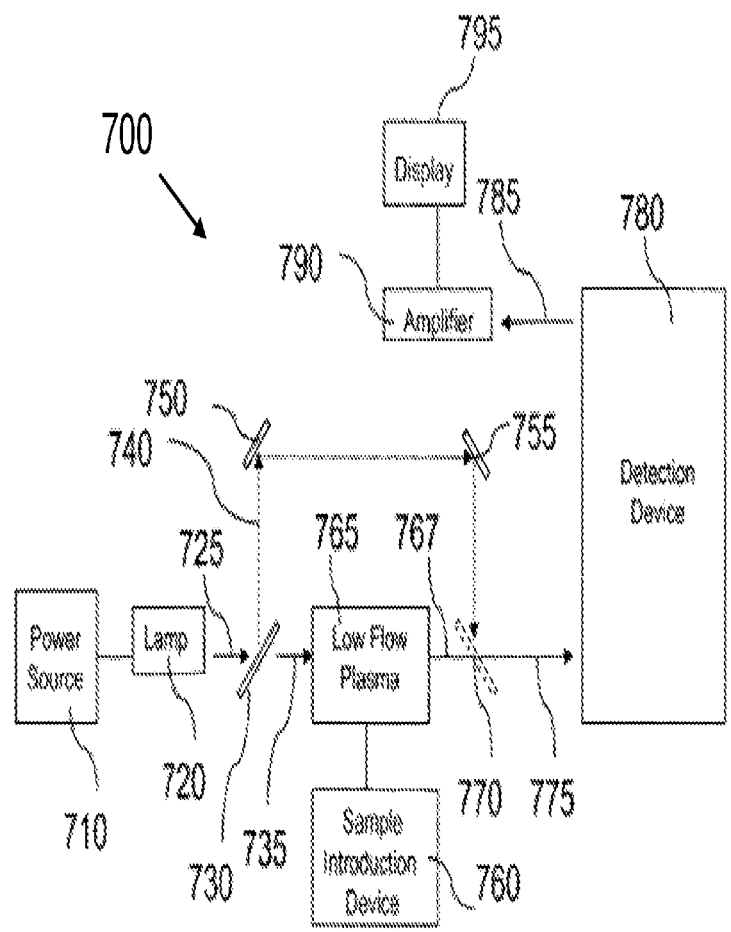
FIG. 21 is another illustration of an absorption spectrometer including a low flow plasma, in accordance with certain examples.

In certain embodiments and referring to FIG. 21, an illustrative dual beam AS device 700 includes a power source 710 in electrical communication with a lamp 720, a low flow plasma 765, a sample introduction device 760 in fluid communication with the low flow plasma 765, a detection device 780 configured to receive a signal from the low flow plasma 765, an optional amplifier 790 configured to receive a signal from the detection device 780 and an output device 795 configured to receive a signal from the amplifier 790. The sample introduction device 760 can include a low flow injector as described herein. In examples where the signal is large enough to be detected using the circuitry and devices in the detection device 780, the amplifier 790 may be omitted. The power source 710 may be configured to supply power to the lamp 720, which provides one or more wavelengths of light 725 for absorption by atoms and ions. Suitable lamps include, but are not limited to, electrode-less discharge lamps, hollow cathode lamps, mercury lamps, cathode ray lamps, lasers, etc., or combinations thereof. The lamp may be pulsed using suitable choppers or pulsed power supplies, or in examples where a laser is implemented, the laser can be pulsed with a selected frequency, e.g. 5, 10 or 20 times per second. The configuration of the lamp 720 can vary. For example, lamp 720 can provide light axially along the low flow plasma 765 or can provide light radially along the low flow plasma 765. The example shown in FIG. 21 is configured for axial supply of light from the lamp 720. There can be signal-to-noise advantages using axial viewing of signals. As sample is atomized and/or ionized in the low flow plasma 765, the incident light 725 from the lamp 720 excites atoms. That is, some percentage of the light 735 that is provided by the lamp 720 is absorbed by the atoms and ions in the low flow plasma 765. At least a substantial portion of the remaining percentage of light 767 is transmitted to the detection device 780. In examples using dual beams, the incident light 725 can be split using a beam splitter 730 such that 50% of the light is transmitted as a beam 735 to the low flow plasma 765 and 50% of the light is transmitted as a beam 740 to lenses 750 and 755. The light beams can be recombined using a combiner 770, such as a half-silvered mirror, and a combined signal 775 may be transmitted to the detection device 780. The ratio between a reference value and the value for the sample can then be determined to calculate the absorbance of the sample. The detection device 780 can select one or more suitable wavelengths using, for example, prisms, lenses, gratings and other suitable devices known in the art, such as those discussed above in reference to the OES devices, for example. In some examples, the detection device 780 may include a solid-state detector, such as a CCD. Signal 785 can be provided to the amplifier 790 for increasing the signal for output to the display 795. The AS device 700 may further include suitable electronics known in the art, such as a microprocessor and/or computer, and suitable circuitry to provide a desired signal and/or for data acquisition. Suitable additional devices and circuitry can be found, for example, on commercially available AS devices such as, for example, AAnalyst series spectrometers commercially available from PerkinElmer Health Sciences, Inc. It will be within the ability of the person of ordinary skill in the art, given the benefit of this disclosure, to retrofit existing dual beam AS devices to generate low flow plasmas and to design new dual beam AS devices using the low flow plasmas disclosed here. The AS devices may further include autosamplers known in the art, such as AS-90A, AS-90plus and AS-93plus autosamplers commercially available from PerkinElmer Health Sciences, Inc. The low flow plasma 765 can be sustained using one or more plate electrodes, as described herein, and a plasma gas flow of about 8 Liters/minute or less, more particularly about 7 Liters/minute of plasma gas or less. In some examples, the total gas flow through the torch can be about 8 Liters/minute or less.

Figure 22:
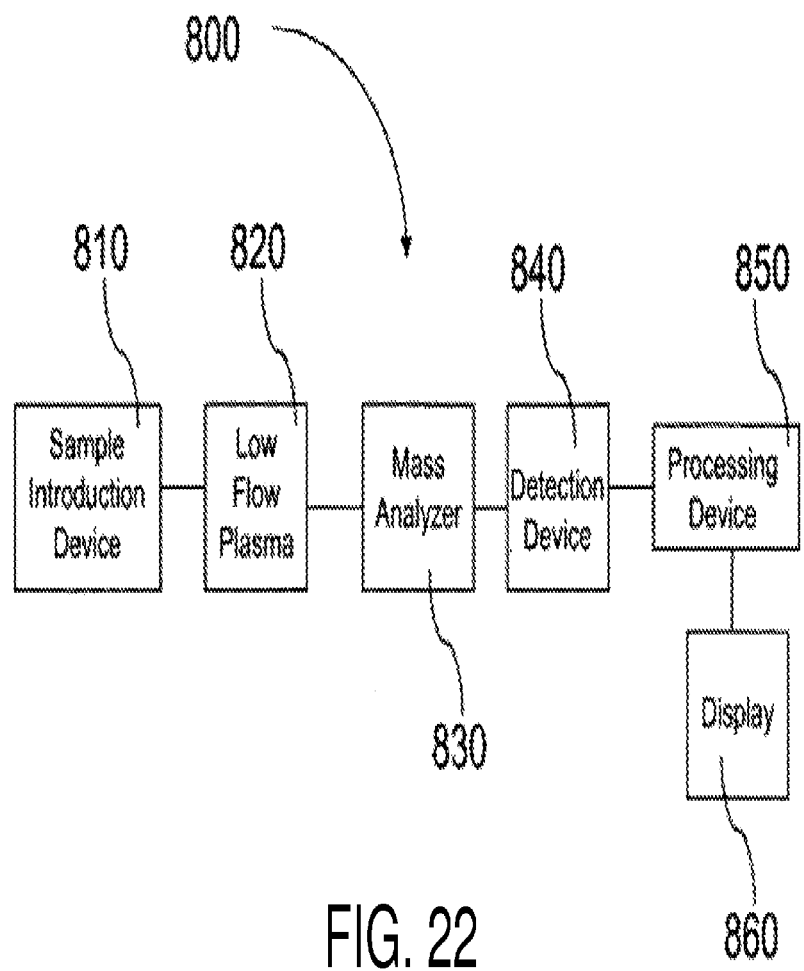
FIG. 22 is an illustration of a mass spectrometer including a low flow plasma, in accordance with certain examples.

In certain embodiments, an illustrative device for mass spectroscopy (MS) is schematically shown in FIG. 22. An MS device 800 includes a sample introduction device 810 in fluid communication with a low flow plasma 820, a mass analyzer 830, a detection device 840, a processing device 850 and a display 860. The sample introduction device 810 can include a low flow injector as described herein. The sample introduction device 810, the low flow plasma 820, the mass analyzer 830 and the detection device 840 may be operated at reduced pressures using one or more vacuum pumps. In certain examples, however, only one or more of the mass analyzer 830 and/or the detection device 840 are operated at reduced pressures. The sample introduction device 820 may include an inlet system configured to provide sample to the low flow plasma 820. The inlet system may include one or more batch inlets, direct probe inlets and/or chromatographic inlets. The sample introduction device 810 may be an injector, a nebulizer or other suitable devices that can deliver solid, liquid or gaseous samples to the low flow plasma 820. The mass analyzer 830 can take numerous forms depending generally on the sample nature, desired resolution, etc. and exemplary mass analyzers are discussed further below. The detection device 840 can be any suitable detection device that can be used with existing mass spectrometers, e.g., electron multipliers, Faraday cups, coated photographic plates, scintillation detectors, etc. and other suitable devices that will be selected by the person of ordinary skill in the art, given the benefit of this disclosure. The processing device 850 typically includes a microprocessor and/or computer and suitable software for analysis of samples introduced into the MS device 800. One or more databases can be accessed by the processing device 850 for determination of the chemical identity of species introduced into the MS device 800. Other suitable additional devices known in the art can also be used with the MS device 800 including, but not limited to, autosamplers, such as AS-90plus and AS-93plus autosamplers commercially available from PerkinElmer Health Sciences, Inc. The low flow plasma 820 can be sustained using one or more plate electrodes, as described herein, and a plasma gas flow of about 8 Liters/minute or less, more particularly about 7 Liters/minute of plasma gas or less. In some examples, the total gas flow through the torch can be about 8 Liters/minute or less.

In certain examples, the mass analyzer of MS device 800 can take numerous forms depending on the desired resolution and the nature of the introduced sample. In certain examples, the mass analyzer is a scanning mass analyzer, a magnetic sector analyzer (e.g., for use in single and double-focusing MS devices), a quadrupole mass analyzer, an ion trap analyzer (e.g., cyclotrons, quadrupole ions traps), time-of-flight analyzers (e.g., matrix-assisted laser desorbed ionization time of flight analyzers), and other suitable mass analyzers that can separate species with different mass-to-charge ratios. The low flow plasmas disclosed herein can be used with any one or more of the mass analyzers listed above and other suitable mass analyzers.

In certain embodiments, the low flow plasmas disclosed here may be used with existing ionization methods used in mass spectroscopy. For example, an electron impact source with a low flow plasma can be assembled to increase ionization efficiency prior to entry of ions into the mass analyzer. In other examples, a chemical ionization source with a low flow plasma may be assembled to increase ionization efficiency prior to entry of ions into the mass analyzer. In yet other examples, a field ionization source with a low flow plasma may be assembled to increase ionization efficiency prior to entry of ions into the mass analyzer. In still other examples, a low flow plasma may be used with desorption sources such as, for example, those sources configured for fast atom bombardment, field desorption, laser desorption, plasma desorption, thermal desorption, electrohydrodynamic ionization/desorption, etc. In yet other examples, a low flow plasma may be configured for use with thermospray or electrospray ionization sources. It will be within the ability of the person of ordinary skill in the art, given the benefit of this disclosure, to design suitable devices for ionization including a low flow plasma for use in mass spectroscopy.

Figure 23:
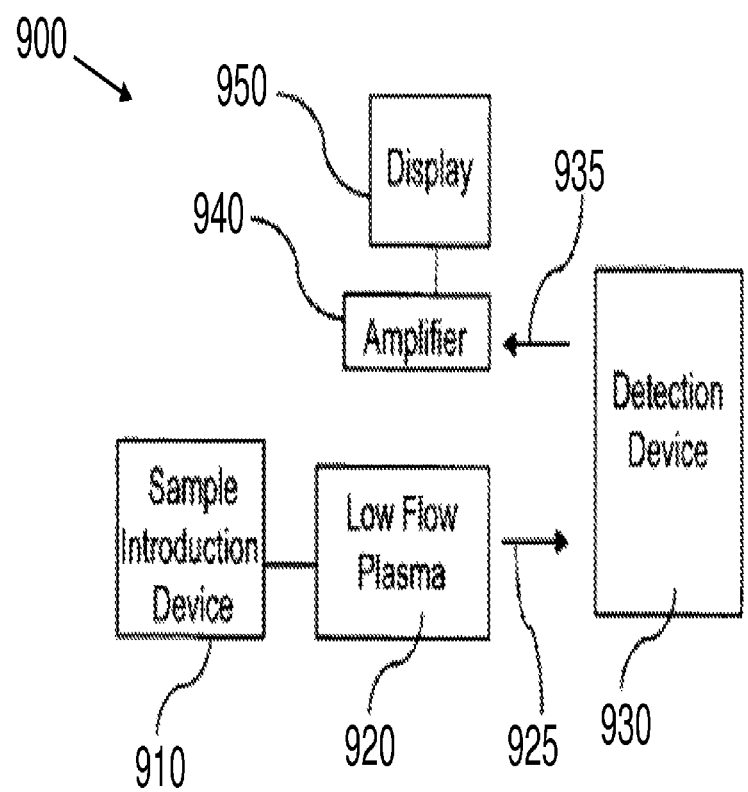
FIG. 23 is an illustration of an optical excitation spectrometer including a low flow plasma, in accordance with certain examples.

In certain examples, the low flow plasma described herein can be used in an optical emission spectrometer. An illustrative optical emission spectrometer (OES) is shown in FIG. 23. The OES device 900 includes a sample introduction device 910, a low flow plasma 920, and a detection device 930. The sample introduction device 910 can include a low flow injector as described herein. An optical emission 925 may be introduced into the detection device 930 and the selected light 935 may pass to an optional amplifier 940, which is in electrical communication with a display 950. The sample introduction device 910 can vary depending on the nature of the sample. In certain examples, the sample introduction device 910 is a nebulizer that is configured to aerosolize liquid sample for introduction into the low flow plasma 920. In other examples, the sample introduction device 910 is an injector configured to receive aerosol sample that can be directly injected or introduced into the plasma. Other suitable devices and methods for introducing samples will be readily selected by the person of ordinary skill in the art, given the benefit of this disclosure. The detection device 930 can take numerous forms and may be any suitable device that can detect optical emissions, such as optical emission 925. For example, the detection device 930 may include suitable optics, such as a lens, a mirror, a prism, a window, a band-pass filter, etc. The detection device 930 may also include a grating, such as an echelle grating, to provide a multi-channel OES device. Gratings such as echelle gratings allow for simultaneous detection of multiple emission wavelengths. The gratings can be positioned within a monochromator or other suitable device for selection of one or more particular wavelengths to monitor. In other examples, the OES device may be configured to implement Fourier transforms to provide simultaneous detection of multiple emission wavelengths. The detection device can be configured to monitor emission wavelengths over a large wavelength range including, but not limited to, ultraviolet, visible, near and far infrared, etc. The detection device may include a solid-state detector, such as a CCD. The OES device 500 may further include suitable electronics such as a microprocessor and/or computer and suitable circuitry to provide a desired signal and/or for data acquisition. Suitable additional devices and circuitry are known in the art and may be found, for example, in commercially available OES devices such as Optima 2100 DV series and Optima 5000 DV series OES devices, which are commercially available from PerkinElmer Health Sciences, Inc. The optional amplifier 540 is operative to increase the signal, e.g., amplify the signal from detected photons, and may provide the signal to the display 950, which may be a printer, readout, computer, etc. In certain examples, the amplifier 940 is a photomultiplier tube configured to receive signals from the detection device 930. Other suitable devices for amplifying signals, however, will be selected by the person of ordinary skill in the art, given the benefit of this disclosure. In examples where the signal is large enough to be detected using the circuitry and devices in the detection device 930, the amplifier 940 may be omitted. It will also be within the ability of the person of ordinary skill in the art, given the benefit of this disclosure, to retrofit existing OES devices to generate low flow plasmas and to design new OES devices using the low flow plasmas disclosed herein. The OES devices may further include autosamplers, such as AS90 and AS93 autosamplers commercially available from PerkinElmer Health Sciences, Inc. or similar devices available from other suppliers. The low flow plasma 920 can be sustained using one or more plate electrodes, as described herein, and a plasma gas flow of about 8 Liters/minute or less, more particularly about 7 Liters/minute of plasma gas or less. In some examples, the total gas flow through the torch can be about 8 Liters/minute or less.

In certain embodiments, the AS, MS and OES devices disclosed here can be hyphenated with one or more other analytical techniques. For example, AS, MS or OES devices can be hyphenated with devices for performing liquid chromatography, gas chromatography, capillary electrophoresis, and other suitable separation techniques. When coupling an MS device that includes a low flow plasma with a gas chromatograph, it may be desirable to include a suitable interface, e.g., traps, jet separators, etc., to introduce sample into the MS device from the gas chromatograph. When coupling an MS device to a liquid chromatograph, it may also be desirable to include a suitable interface to account for the differences in volume used in liquid chromatography and mass spectroscopy. For example, split interfaces can be used so that only a small amount of sample exiting the liquid chromatograph is introduced into the MS device. Sample exiting from the liquid chromatograph may also be deposited in suitable wires, cups or chambers for transport to the low flow plasma of the MS device. In certain examples, the liquid chromatograph includes a thermospray configured to vaporize and aerosolize sample as it passes through a heated capillary tube. In some examples, the thermospray may include its own low flow plasma to increase ionization of species using the thermospray. Other suitable devices for introducing liquid samples from a liquid chromatograph into a MS device, or other detection device, will be readily selected by the person of ordinary skill in the art, given the benefit of this disclosure.

In certain examples, an MS device that includes a low flow plasma is hyphenated with at least one other MS device, which may or may not include a low flow plasma, for tandem mass spectroscopy analyses. For example, one MS device can include a first type of mass analyzer and the second MS device can include a different or similar mass analyzer as the first MS device. In other examples, the first MS device may be operative to isolate the molecular ions and the second MS device may be operative to fragment/detect the isolated molecular ions. It will be within the ability of the person of ordinary skill in the art, to design hyphenated MS/MS devices at least one of which includes a low flow plasma. It will be recognized by the person of ordinary skill in the art, given the benefit of this disclosure, that three or more MS devices, any one of which can include a low flow plasma, can be hyphenated to each other.

Suitable electronic components for providing current to the electrodes will be readily selected by the person of ordinary skill in the art, given the benefit of this disclosure. For example, illustrative RF sources and oscillators may be found in U.S. Pat. No. 6,329,757, the entire disclosure of which is hereby incorporated herein by reference for all purposes.

Certain specific examples are described below to illustrate further the novel technology described herein Example 1

Low Flow Plasma Using Plate Electrodes

An induction device including two plate electrodes, each of which was grounded to grounding plate was assembled as described in U.S. Pat. No. 7,511,246. The plate electrodes were each 2 mm thick plates machined out of 50-52 sheet aluminum. A modified face plate was installed and evaluated on Optima 2000 and Optima 4000 instruments, available from PerkinElmer Health Sciences, Inc. This face plate included the replacement of the conventional helical load coil with the grounding plate and the plate electrodes. Very minor modifications were needed to the faceplate to include clearance holes where needed for the bolts securing mounting blocks. No functional changes were made to the generator.

Figure 24:
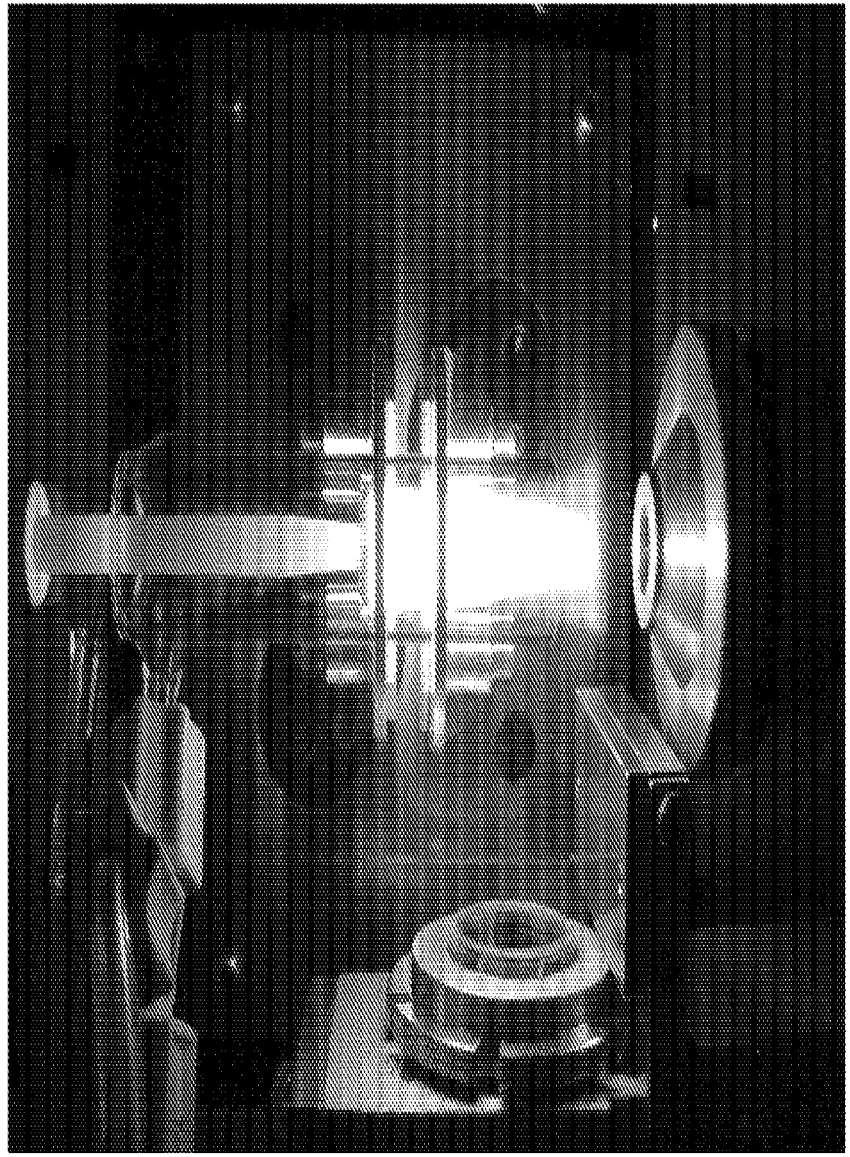
FIG. 24 is a photograph of a low flow plasma sustained using first and second plate electrodes and a plasma gas flow rate of about 7 Liters/minute, in accordance with certain examples.

The modified instrument was used to generate and sustain a low flow plasma in a conventional torch to demonstrate low flow conditions. The flow rates were as follows for the low flow plasma: Plasma=7 Liters/minute, Auxiliary=0.2 Liters/minute, and Nebulizer=0.55 Liters/minute for a total of 7.75 Liters/minute of Argon gas. The low flow plasma was sustained using 1300 Watts of power. A photograph of the sustained low flow plasma is shown in FIG. 24.

Relative detection limits were measured using the low flow plasma and using a plasma generated using a conventional helical load coil and using the plate electrodes at non-low flow conditions. All values were averaged together, and each value was then compared to that average value. The following non-low flow conditions were used with the conventional helical load coil: Plasma=15 Liters/minute, Auxiliary=0.2 Liters/minute, and Nebulizer=0.85 Liters/minute for a total of 16.05 Liters/minute of Argon gas. For the plate electrodes, the following flow rates were used: Low flow flat plate Plasma=7 Liters/minute, Auxiliary=0.2 Liters/minute, and Nebulizer=0.55 Liters/minute for a total of 7.75 Liters/minute of Argon gas; non-low flow flat plate Plasma=15 Liters/minute, Auxiliary=0.2 Liters/minute, and Nebulizer=0.55 Liters/minute for a total of 15.75 Liters/minute of Argon gas. The results are shown in FIG. 22.

Figure 25:
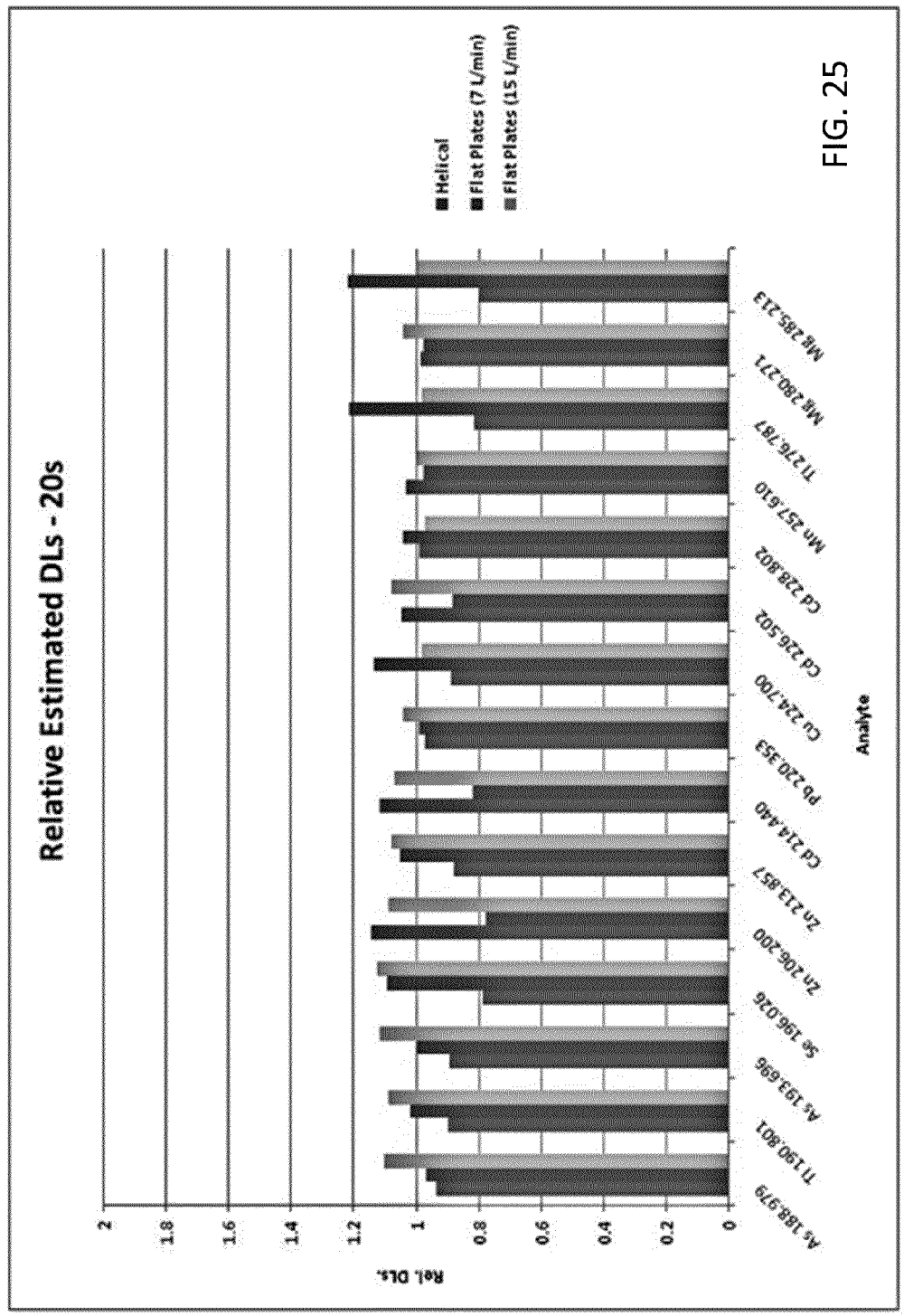
FIG. 25 is a graph showing the detection limits for various analytes when using conventional helical load coils, when using flat plate electrodes at conventional flow rates of about 15 Liters/minute of plasma gas and when using flat plate electrodes at low flow rates of about 7 Liters/minute of plasma gas.

As can be seen from the graph in FIG. 25, the detection limits using the low flow plasma and the plate electrodes are comparable to the detection limits using conventional helical load coils. In addition, in most instances the detection limits of the analytes using the low flow plasma and the plate electrodes were better than the detection using conventional flow rates with plate electrodes.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

The invention claimed is:

1. A system for sustaining a plasma, the system comprising:
   a plate electrode comprising an aperture configured to receive a torch,
   a torch sized and arranged to be positioned within at least some portion of the aperture of the plate electrode, the torch comprising an outer tube and an auxiliary tube within the outer tube, in which the outer tube comprises a slot configured to provide the outer tube with a substantially equal radius along an entire length of the outer tube, the torch configured to permit generation of the plasma in the torch at a plasma gas flow rate of about 8 liters/minute or less.

2. The system of claim 1, in which the auxiliary tube is about 83 mm long and the slot is about 15 mm long.

3. The system of claim 1, in which the auxiliary tube is about 80-90 mm long.

4. The system of claim 1, in which the torch comprises at least three slots each configured to provide the outer tube with a substantially equal radius along the entire length of the outer tube.

5. The system of claim 4, in which each slot is about 15 mm long.

6. The system of claim 1, further comprising an oscillator electrically coupled to the plate electrode.

7. The system of claim 1, further comprising an additional plate electrode comprising an aperture configured to receive the torch.

8. The system of claim 7, further comprising an oscillator electrically coupled to the plate electrode and the additional plate electrode.

9. The system of claim 8, in which the oscillator is configured to control the plate electrode and the additional plate electrode independently.

10. The system of claim 9, further comprising a detector optically coupled to the torch.

11. An inductively coupled plasma sustained in a torch using a plasma gas flow of 8 liters/minute or less, the torch comprising an outer tube and an auxiliary tube within the outer tube, in which the outer tube comprises a slot configured to provide the outer tube with a substantially equal radius along an entire length of the outer tube to permit the inductively coupled plasma to be sustained using the plasma gas flow of 8 liters/minute or less.

12. The plasma of claim 11, in which the auxiliary tube is about 80-90 mm long.

13. The plasma of claim 12, in which the auxiliary tube is about 83 mm long.

14. The plasma of claim 11, in which the slot is about 15 mm long.

15. The plasma of claim 11, in which an emission region and plasma region of the plasma are compressed.

16. The plasma of claim 11, in which the plasma is sustained in the torch using in the outer tube, in which the outer tube comprises three slots each configured to provide the outer tube with a substantially equal radius along an entire length of the outer tube to permit the plasma to be sustained using the plasma gas flow of 8 liters/minute or less.

17. The plasma of claim 16, in which the three slots are spaced equally around the circumference of the outer tube.

18. The plasma of claim 11, in which the plasma is sustained using argon.

19. The plasma of claim 11, in which the total gas flow used to sustain the plasma is less than 9 liters/minute.

* * * * *